US 11,763,605 B2

(12) United States Patent
de Matos et al.

(10) Patent No.: US 11,763,605 B2
(45) Date of Patent: Sep. 19, 2023

(54) SYNCHRONIZED ONLINE/OFFLINE CLOCK IN MANAGEMENT

(71) Applicant: TOTVS Inc., Raleigh, NC (US)

(72) Inventors: Hamilton de Matos, Sao Paulo (BR); Robson Poffo, Aoex, NC (US); Bruno Furtado, Curitiba (BR); Jean Da Rolt Joachim, Bento Gonçalves (BR); Jansel Valentin, Santo Domingo (DO); Varun Dhital, Santa Clara, CA (US); Bruno Candido Volpato da Cunha, Raleigh, NC (US); Carlos Affonso Wagner, Joinville (BR); Ingo Wagner, Raleigh, NC (US); Mithun Puthige Acharya, Cary, NC (US); Vincent Goetten, Raleigh, NC (US)

(73) Assignee: TOTVS Inc., Raleigh, NC (US)

( * ) Notice: Subject to any disclaimer, the term of this patent is extended or adjusted under 35 U.S.C. 154(b) by 239 days.

(21) Appl. No.: 17/013,261

(22) Filed: Sep. 4, 2020

(65) Prior Publication Data

US 2022/0076506 A1 Mar. 10, 2022

(51) Int. Cl.
*G07C 1/10* (2006.01)
*G07C 9/37* (2020.01)
(Continued)

(52) U.S. Cl.
CPC ........... *G07C 1/10* (2013.01); *G06Q 10/1091* (2013.01); *G06V 40/172* (2022.01); *G07C 9/37* (2020.01);
(Continued)

(58) Field of Classification Search
CPC ........ G07C 1/10; G07C 9/37; G06Q 10/1091; H04W 12/61; H04W 12/06; G06V 40/40
See application file for complete search history.

(56) References Cited

U.S. PATENT DOCUMENTS 8,333,321 B2 12/2012 Gressel et al.
8,671,001 B1 3/2014 Thompson et al.
(Continued)

FOREIGN PATENT DOCUMENTS

JP 2019082802 A 5/2019
WO 2007036024 A1 4/2007

OTHER PUBLICATIONS

Brooks, C., The Best Time and Attendance Systems of 2020, Business News Daily, https://www.businessnewsdaily.com/6730-best-time-and-attendance-systems.html, accessed Jul. 25, 2020, 2 Pages.
The Easiest to Use Employee In Out Board Software • Simple In/Out, Simply Made Apps, Inc., https://www.simpleinout.com, accessed Jul. 25, 2020, 1 Page.

*Primary Examiner* — Vernal U Brown
(74) *Attorney, Agent, or Firm* — Vorys, Sater Seymour and Pease LLP; Michael V. Messinger

(57) ABSTRACT

Systems, devices, and methods for synchronized clock in management. In an embodiment, a system enables users to clock in to a cloud computing platform over a network through remote clock in devices, regardless of whether the remote clock in devices are online or offline. A clock in manager on the platform is configured to communicate with clock in assistants on remote clock in devices and to manage clock in of users in self and group clock in modes. A predetermined threshold may be used to determine a match with respect to a captured image. A clock in manager may intelligently determine the predetermined threshold according to algorithms based on training data. Face scan guides, liveness detection, and fraud detection may be included. A report engine supports presentations of filtered data from a control panel including map displays of devices or clock in events according to geolocation.

29 Claims, 37 Drawing Sheets

(51) Int. Cl.
*H04W 12/06* (2021.01)
*G06Q 10/1091* (2023.01)
*H04W 12/61* (2021.01)
*H04W 12/63* (2021.01)
*G06V 40/16* (2022.01)

(52) U.S. Cl.
CPC ........... *H04W 12/06* (2013.01); *H04W 12/61* (2021.01); *H04W 12/63* (2021.01); *G07C 2209/08* (2013.01)

(56) References Cited

U.S. PATENT DOCUMENTS

| | | | |
|---|---|---|---|
| 8,761,001 B2 * | 6/2014 | Mao | H04L 12/2858 370/220 |
| 9,727,923 B2 | 8/2017 | Teh et al. | |
| 2015/0098631 A1 * | 4/2015 | Palmer | G06Q 10/10 382/118 |
| 2019/0057340 A1 | 2/2019 | Wang | |
| 2019/0080189 A1 * | 3/2019 | Van Os | G06V 40/166 |
| 2019/0286927 A1 * | 9/2019 | Ionita | G06V 40/168 |
| 2019/0289013 A1 * | 9/2019 | Makmel | H04L 63/0876 |
| 2021/0287472 A1 * | 9/2021 | Niu | G07C 9/37 |

* cited by examiner

| imposter | recognized | correctly | | |
|---|---|---|---|---|
| IMPOSTER | NOTRECOGNIZED | NA | GOOD | 1 |
| | RECOGNIZED | NA | NOT DESIRABLE | 2 |
| NOTIMPOSTER | NOTRECOGNIZED | NA | NOT DESIRABLE | 3 |
| | RECOGNIZED | CORRECTLY | GOOD | 4 |
| | | INCORRECTLY | NOT DESIRABLE | 5 | notimposter_recognition_rate = $\boxed{4} / \boxed{3} + \boxed{4} + \boxed{5}$ imposter_recognition_rate = $\boxed{2} / \boxed{1} + \boxed{2}$ accuracy = $\boxed{1} + \boxed{4} / \boxed{1} + \boxed{2} + \boxed{3} + \boxed{4} + \boxed{5}$

FIG. 14B

FIG. 15D 2001   2002

```
← → C ⌂  🔒 global.carol.ai/clockin/apps/dev/clockinapp/3.16.1-b/#/
```

| | CAROL-CLOCK IN |
|---|---|
| ⊙ TOTVS | |
| 🏢 Companies | Applied filters |
| ⊚ Locations | |
| ☐ Devices | Device location ⌄   All devices |
| ≡ Devices List | |
| ⊕ Devices map | Tax ID ⌄   Integrates HR |
| ⊚ Clock-ins map | |
| 🙂 Employees | | robson.poffo@totvs.com ☐
⊚ No data - -78.639015, 35.773388
○ Clock-Ins: 1 - Aug 15, 2019

[bar chart: Thu Fri Sat Sun Mon Tue Wed]

Device: No data - IMEI: No data robson.poffo
⊚ No data - -46.6
○ Clock-Ins: 2-

[bar chart: Thu Fri]

Device: No data - robson.poffo@totvs.com) ☐
⊚ Robson's Location - -78.874535, 35.727028
○ Clock-Ins: 1 - Jun 8, 2020

[bar chart: Thu Fri Sat Sun Mon Tue Wed]
⬇ Download
Device: REP 051 Robson's Phone - IMEI: No data robson.poffo
⊚ Robson's locati
○ Clock-Ins: 1 - J

[bar chart: Thu Fri]

Device: REP 051

FIG. 20A-A

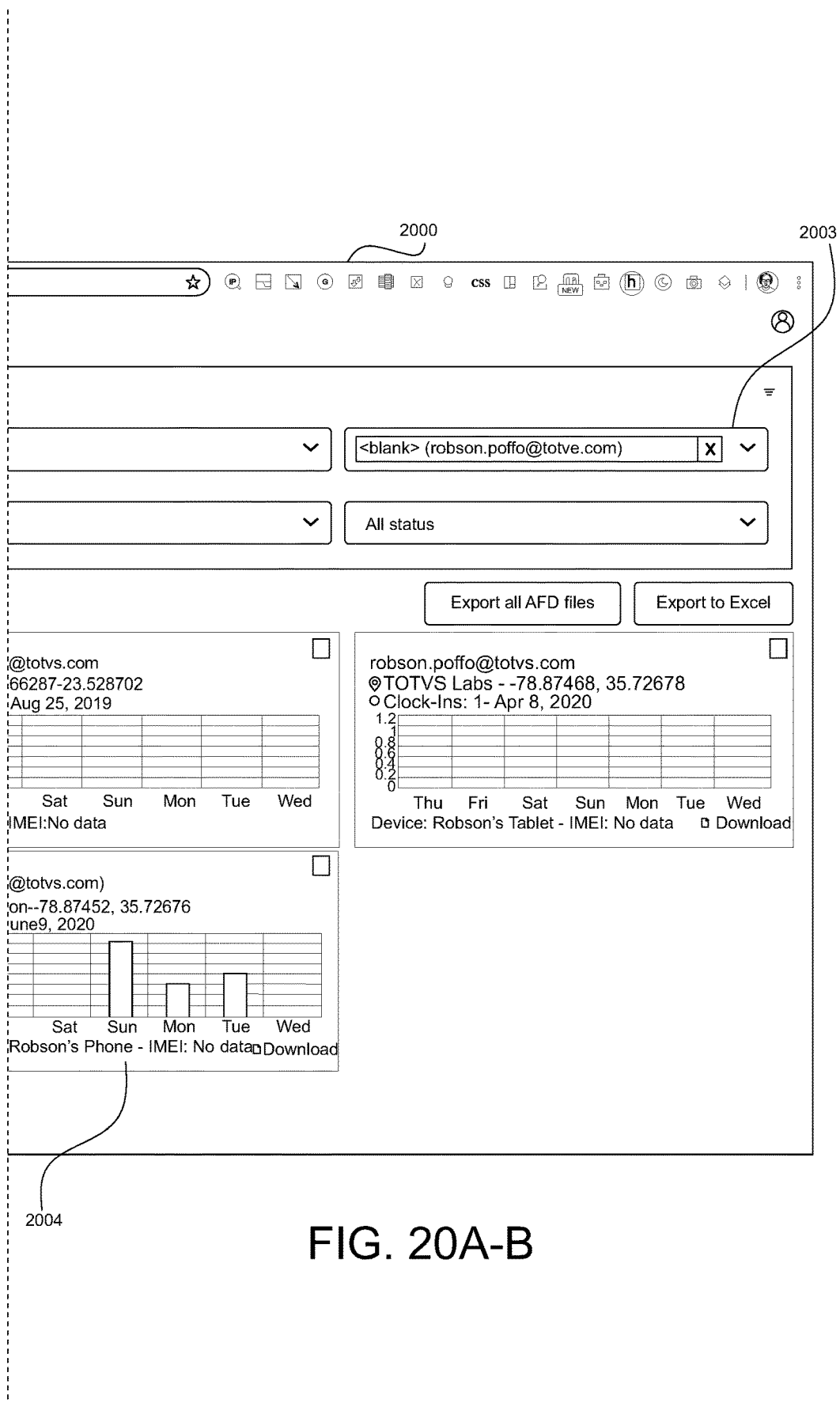
FIG. 20A-B

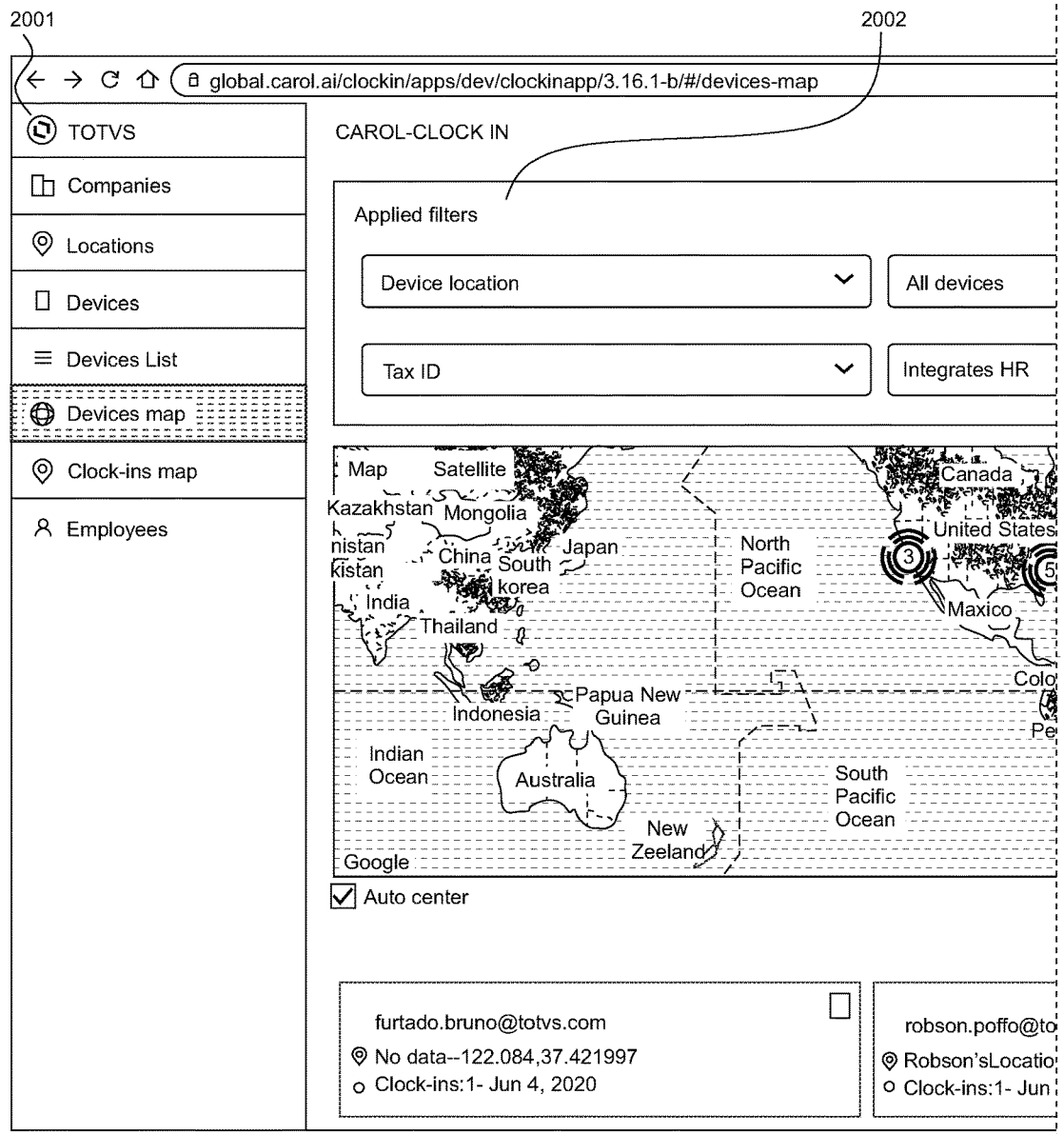
FIG. 20B-A

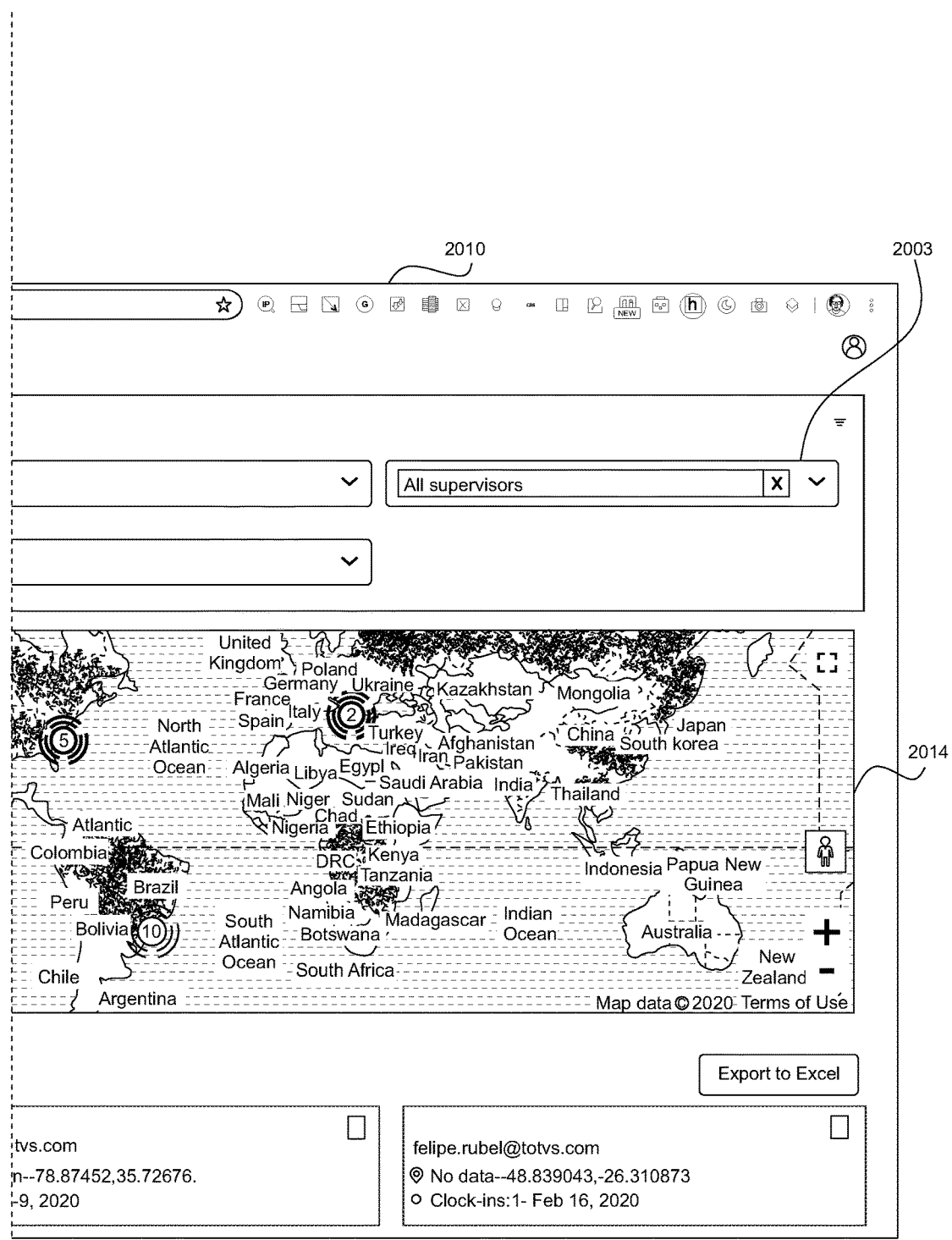
FIG. 20B-B

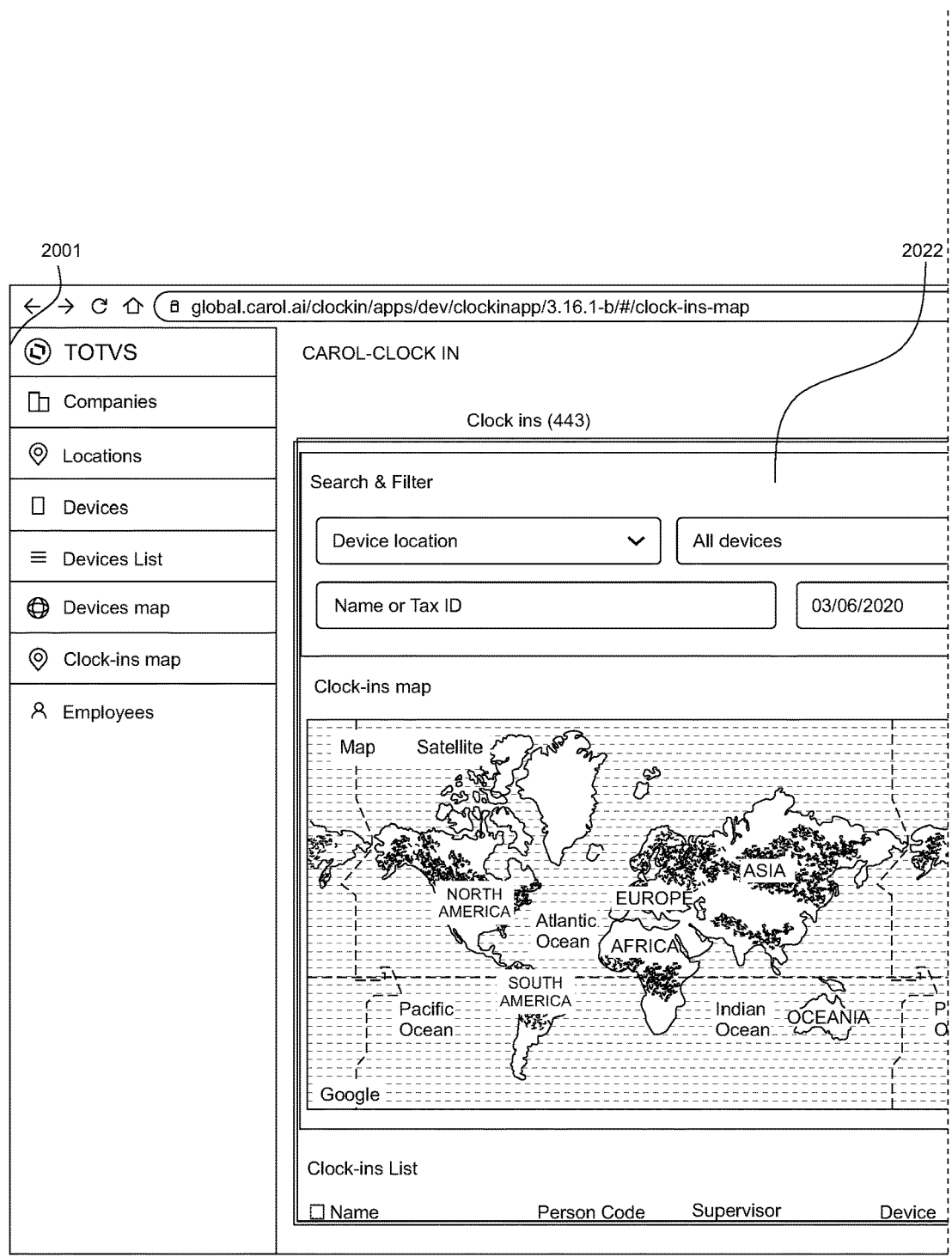
FIG. 20C-A

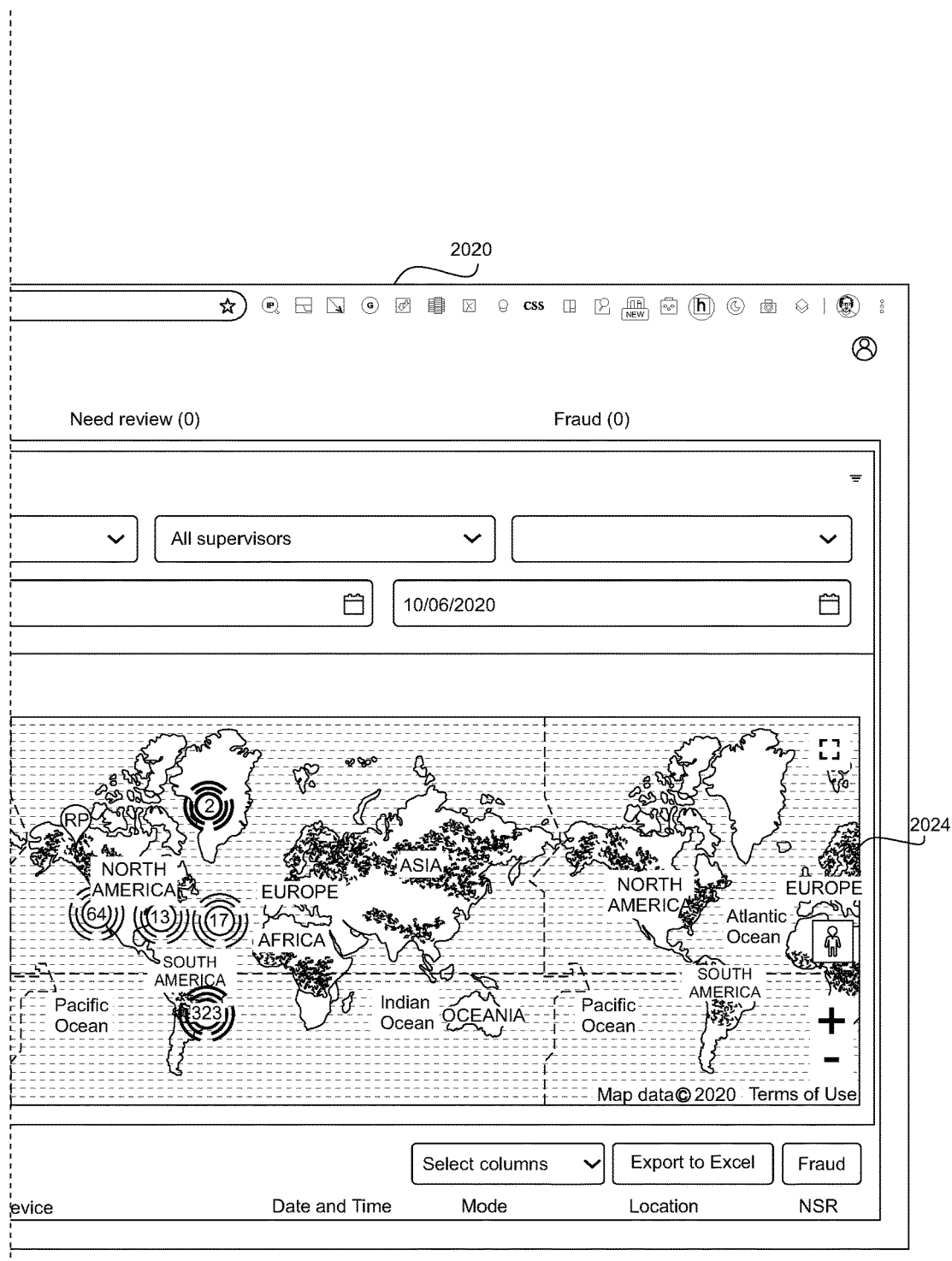
FIG. 20C-B

SYNCHRONIZED ONLINE/OFFLINE CLOCK IN MANAGEMENT

TECHNICAL FIELD

The technical field of the present disclosure relates to computer-implemented clock in management with machine learning.

BACKGROUND ART

Recording check in and presence of personnel or authorized users is important in a variety of applications. Employers capture time and attendance information of employees and contractors for payroll, human resource management, billing, security and other purposes. Event organizers, universities, schools, organizations, government, businesses, non-profits, and other entities may also require check in and record time and attendance for carrying out events and other operations. See, e.g., Real-time Attendance Reporting, U.S. Pat. No. 8,671,001, and Online/Offline Event Related Access Control Systems with Event Specific Closed Venue Wireless Applications, U.S. Pat. No. 8,333,321.

Different types of devices have been used to support employee or contractor check in (also called clock in). Punch card devices used ink stamps and other ways to imprint a timestamp with day and time information. Computing devices such as touch screen displays have also been used to allow a user to input check in information at a physically secure point of entry such as a receptionist desk or employee access door. Card readers, badge readers, and peripheral biometric devices have also been used to further facilitate employee check in and allow input of associated employee data and more secure check of biometric data. Computer networks allow time and attendance systems implemented through enterprise software to have multiple devices and support check in at multiple locations at the same or different company sites. Applications on mobile devices, such as tablets and smart phones, have developed recently which allow online users to check in. An online user may input his or her credentials or identifying information. A registration unit or manager unit on a remote cloud server may then perform a comparison to verify a user at check in and record simple clock in data, such as day and time of online check in. Location may also be checked. See, Method and System for Automated time Management, US Publ. Pat. Appl. No. 2019/0057340.

However, as the inventors recognized, a number of technical limitations and drawbacks remain that prevent effective clock in. In many applications, clock in needs to occur at locations which are offsite, not physically secure, or offline due to being outside the range of existing cellular or wireless data networks. In environments, such as remote farming, construction, and clean power installation, there may exist no access to onsite computers having enterprise software. Also check in through online computers can be prohibitive when an employee is required to be physically present at a point of entry or reception desk. This can be especially problematic during a pandemic or other event requiring employees and contractors to work remotely. Conventional time and attendance carried out at remote locations may lack physical security and be more vulnerable to fraud and abuse. Even when systems allow a user to check in remotely through a mobile application on their own mobile device often the check in is a limited comparison at a remote cloud server that fails to use training data or leverage machine learning over time. Groups of new employees or contractors are also hard to identify in conventional time and attendance systems that require prior training of new employees or contractors for online check in.

What is needed are methods, systems, and devices to overcome the above technical problems.

BRIEF SUMMARY

The present disclosure provides technical solutions to overcome the above problems.

Embodiments of the present disclosure provide synchronized clock in management including self clock in and group clock in online and offline clock in devices. Systems, devices, and methods for synchronized clock in management are described.

In an embodiment, a system enables users to clock in to a cloud computing platform over a network through remote clock in devices, regardless of whether the remote clock in devices are online or offline. The clock in devices include clock in assistants having self clock in and group in modes. The platform includes a clock in manager configured to communicate with clock in assistants on remote clock in devices and to manage clock in of users in self or group clock in modes.

User clock in data records may be stored in memory on clock in devices and on the platform. In an embodiment, a clock in device may include a database storing one or more user clock in data records. Each user data record includes personnel data, facial image data, associated encoding, and clock in event data for one or more recent clock in events. Similarly, user clock in data records may be stored in databases on the platform. User clock in data records may be synchronized between the platform and the clock in devices so that most recent clock in events are stored.

In a self clock in mode, a user may clock in through a clock in device. A clock in assistant enables the user to input a facial image. The clock in assistant may verify a clock in by a user in a self clock in mode based on a comparison of encoding data captured at the time of clock in with encoding data stored in the local storage in memory on the clock in device even when offline. Encodings of facial images may be compared quickly on the clock in device to verify a match.

In a group clock in mode, an authorized user may clock in through a clock in device. A clock in assistant enables the user to input a facial image of other users. The clock in assistant may present a set of candidate users for recognition by the authorized user. The set of candidates may be determined even when a clock in device is offline based on a comparison of encoding data captured at the time of clock in with encoding data stored in the local storage in memory on the clock in device. Encodings of facial images may be compared quickly on the clock in device to recognize a match for a candidate.

In embodiments, face scan placement guides may be presented. Liveness may be detected. Fraud may also be detected.

In a further embodiment, a predetermined threshold may be used to determine a match with respect to a captured image. In one feature, a clock in manager may intelligently determine the predetermined threshold according to algorithms based on training data.

Data analytics may also be provided. A report engine may be configured to apply one or more filters to clock in data stored in a platform database. A report engine is configured to enable a user to select one or more presentations of filtered data from a control panel including map displays of devices or clock in events according to geolocation.

Further embodiments, features, and advantages of this invention, as well as the structure and operation and various embodiments of the invention, are described in detail below with reference to accompanying drawings.

BRIEF DESCRIPTION OF THE DRAWINGS/FIGURES

The patent or application file contains at least one drawing.

The accompanying drawings, which are incorporated herein and form part of the specification, illustrate the present disclosure and, together with the description, further serve to explain the principles of disclosure and to enable a person skilled in the relevant art to make and use the disclosure.

FIG. 14B illustrates different states that may be obtained in recognition results and associated imposter/not imposter recognition rates and accuracy rate calculations according to an embodiment of the present invention.

FIGS. 15A-15E illustrate images that may be displayed during self clock in operations at a remote device according to an embodiment of the present invention.

FIGS. 20A-A, 20A-B, 20B-A, 20B-B, 20C-A, and 20C-B illustrate images that may be displayed at a back end of the clock in management system to facilitate analysis and reporting of clock in operations according to an embodiment of the present invention.

Figure 1:
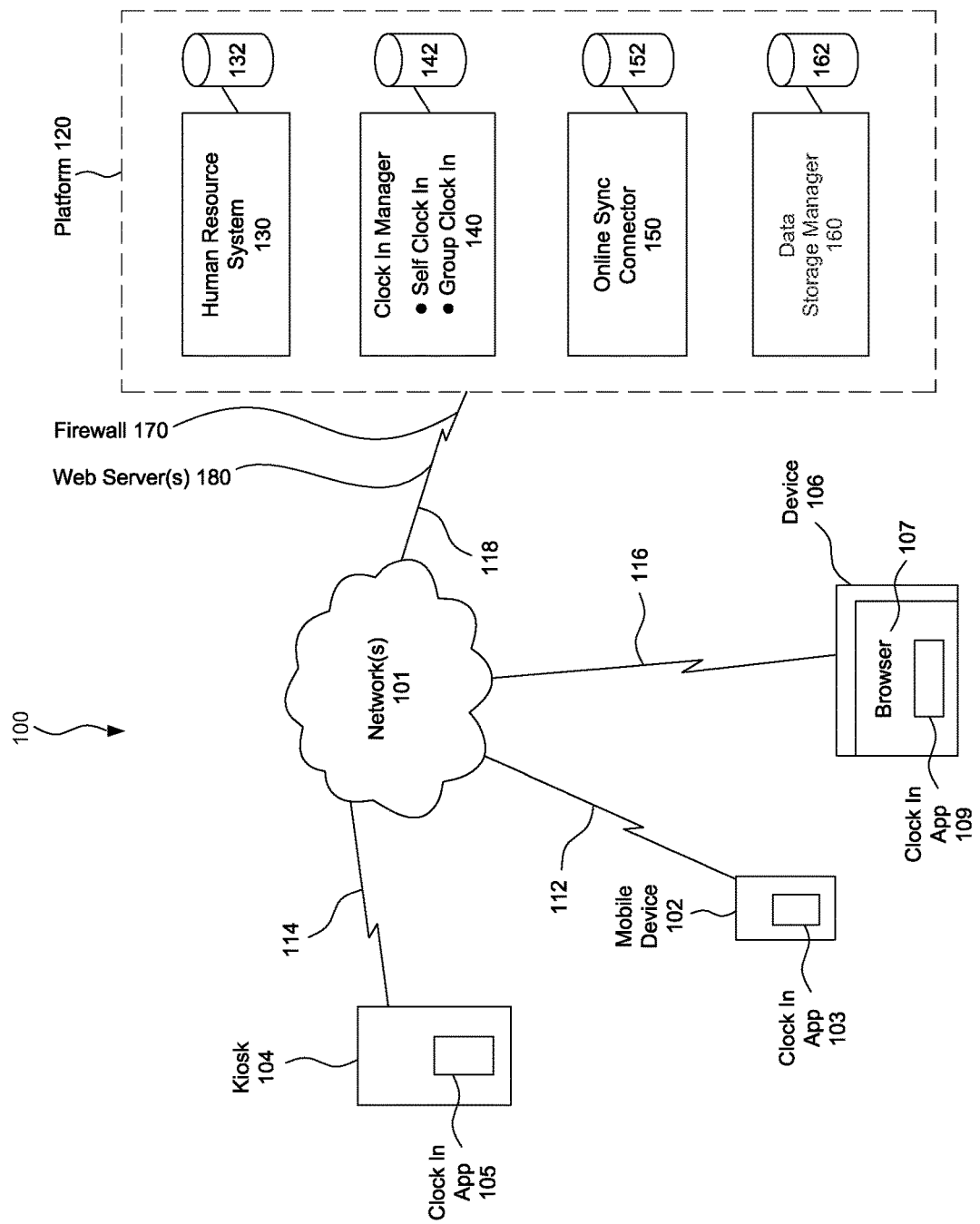
FIG. 1 is a diagram of a clock in management system according to an embodiment of the present invention.
Figure 21:
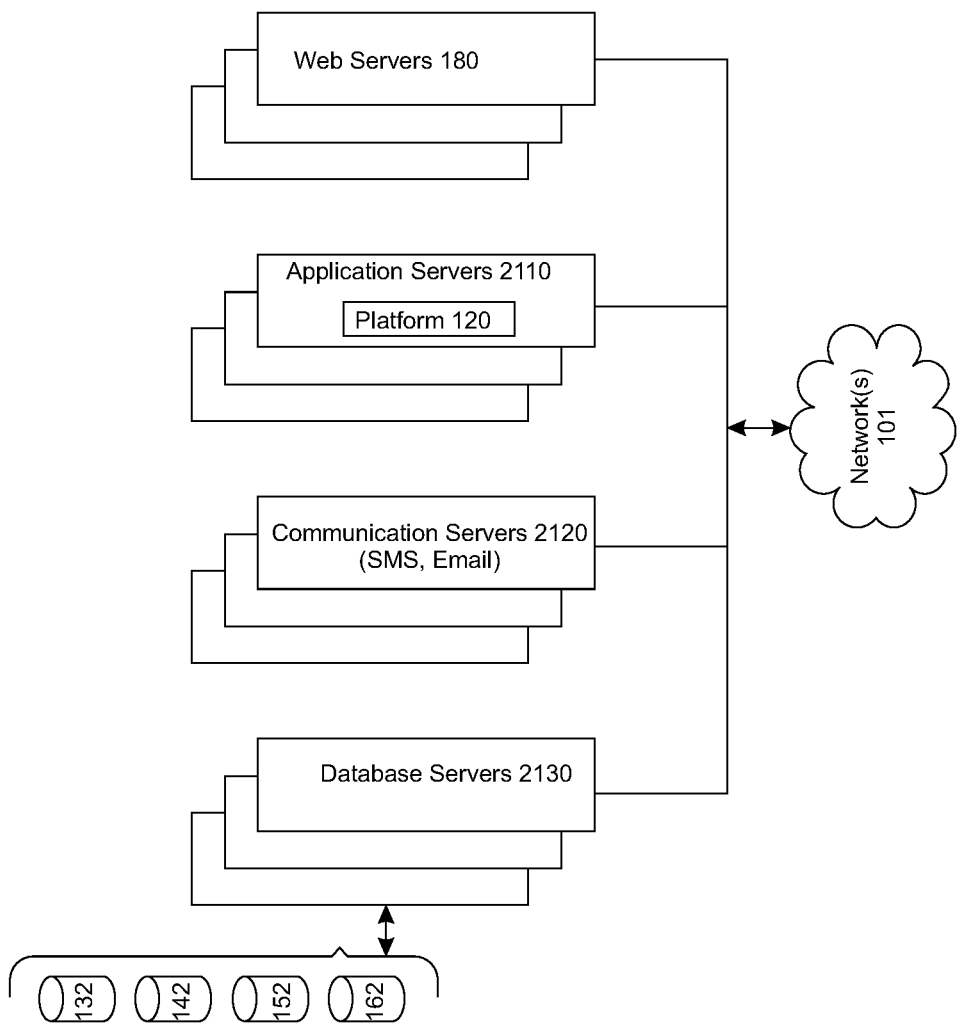

FIG. 21 is a diagram of an example back-end architecture supporting the clock in management system of FIG. 1 according to an embodiment of the present invention.

Figure 22:
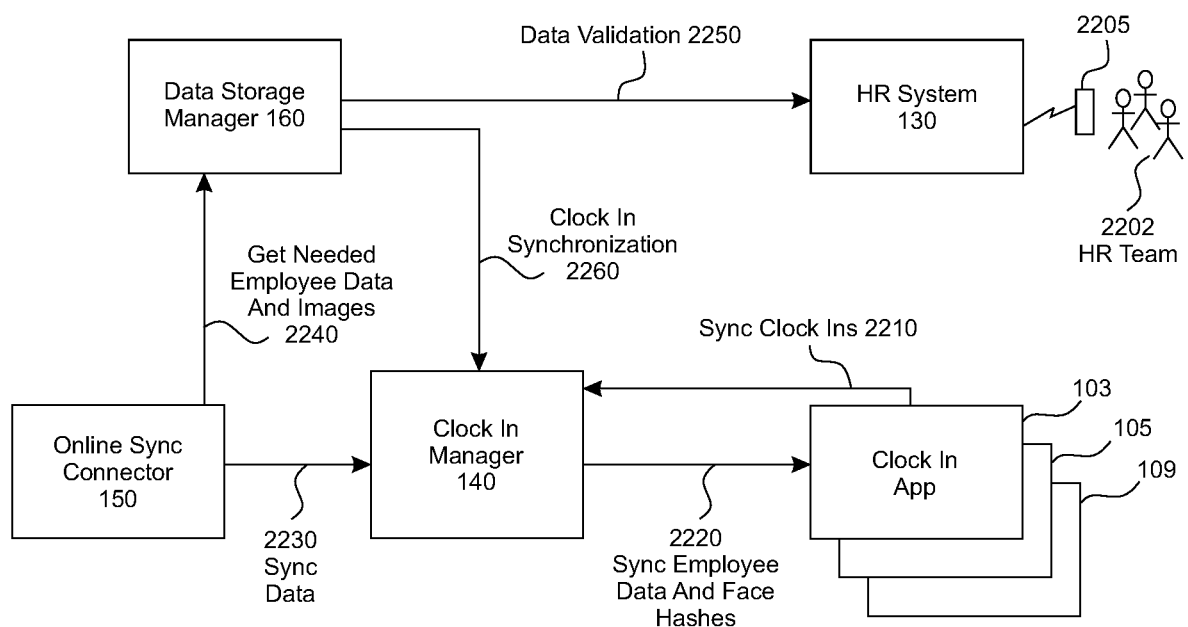

FIG. 22 is a diagram that illustrates data flow between platform components to synchronize data for clock in operations according to an embodiment of the present invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

The present disclosure describes systems, devices, and methods for synchronized clock in management.

Terminology

The terms "clock in" and "clock in event" are used interchangeably and refer to an event where a user checks into a clock in management system or is checked into a clock in management system by another user.

The terms "encoding" and "encoding data" are used interchangeably and refer to an encoding representative of a digital facial image. An encoding may include but is not limited to an array data structure, a one-way hash, a one-way signature, or a fingerprint representative of at least a facial region of a digital image.

The term "clock in encoding data" refers to data that includes at least facial image data representing a digital image of a user face and associated encoding of the facial image data, or simply the encoding data of the facial image.

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Clock in Management System

FIG. 1 is a diagram of a computer-implemented clock in management system 100 according to an embodiment of the present invention. Clock in management system 100 allows one or more users to perform self clock in or group clock in operations. A self clock in operation enables a user to input a clock in event into system 100. A group clock in enables an authorized user to input clock in events for a group of other users. For example, a manager or supervisor can group clock in a number of employees at a farm or other work site. Self clock in or group clock in operations may be performed on computing devices at different locations over one or more network(s) 101 coupled to a remote platform 120. Network 101 may be a data or telephony network or combinations of data or telephony networks including, but not limited to, a local area network, medium area network or wide area network, such as, the Internet.

In embodiments, users may use clock in devices to perform self or group clock in. Each clock in device has a clock in assistant. In the examples shown in FIG. 1, a clock in assistant may be configured as an application (103, 105, 109) on a computing device (such as a mobile device 102, kiosk 104, or tablet 106). Further embodiments of a clock in device 201 and clock in assistant 203 are described in more detail with respect to FIG. 2.

As shown in FIG. 1, clock in devices may be computing devices, such as, mobile device 102, kiosk 104, and tablet computing device 106, to communicate with a remote platform 120 over wireless or wired communication links. For example, mobile device 102 may be coupled to remote platform 120 over a wireless communication link 112 and network(s) 101. Kiosk device 104 may be coupled to remote platform 120 over a wireless communication link 114 and network(s) 101. Tablet device 106 may be coupled to remote platform 120 over a wireless communication link 116 and network(s) 101. In different embodiments, clock in applications (103, 105, 109) may be applications installed on computing devices or may be web applications operated through browsers (such as browser 107) on computing devices. Each clock in application (103, 105, 109) may enable a user to perform a self clock in or a group clock in through clock in devices 102, 104 and 106 as described herein. One or more firewalls 170 and one or more web servers 180 may also be included to provide further security and support web services in communications over communication link(s) 118 between remote platform 120 and clock in applications 103, 105, 109 as would be apparent to a person skilled in the art given this description.

Platform 120 includes human resource system 130, clock in manager 140, online sync connector 150 and data storage manager 160. Human resource system 130 manages human resource (HR) records under control of a human resource team or other authorized user. HR records may include user data (e.g., facial image and employee or contractor identification data) captured at enrollment or updated during a length of service. Clock in manager 140 manages self clock in and group clock in events and synchronization of data collected in online and offline self clock in and group clock in events. Online sync collector 150 may also initiate synchronization of clock in data. One more databases 132, 142, 152, and 162 may be included for storing records having user clock in data. Remote platform 120 (including human resource system 130, clock in manager 140, online sync connector 150 and data storage manager 160) may be configured on one or more remote servers on the same or different computing devices.

Platform 120 may be implemented as a platform having on one or more servers in a cloud computing system providing data storage, communication, computing, and application services to support operation with remote applications and devices as described herein. An example architecture supporting platform 120 is described below with respect to FIG. 21. An example data flow for synchronization of offline and online clock in events for platform 120 is described with respect to FIG. 22.

Clock in Device

Figure 2:
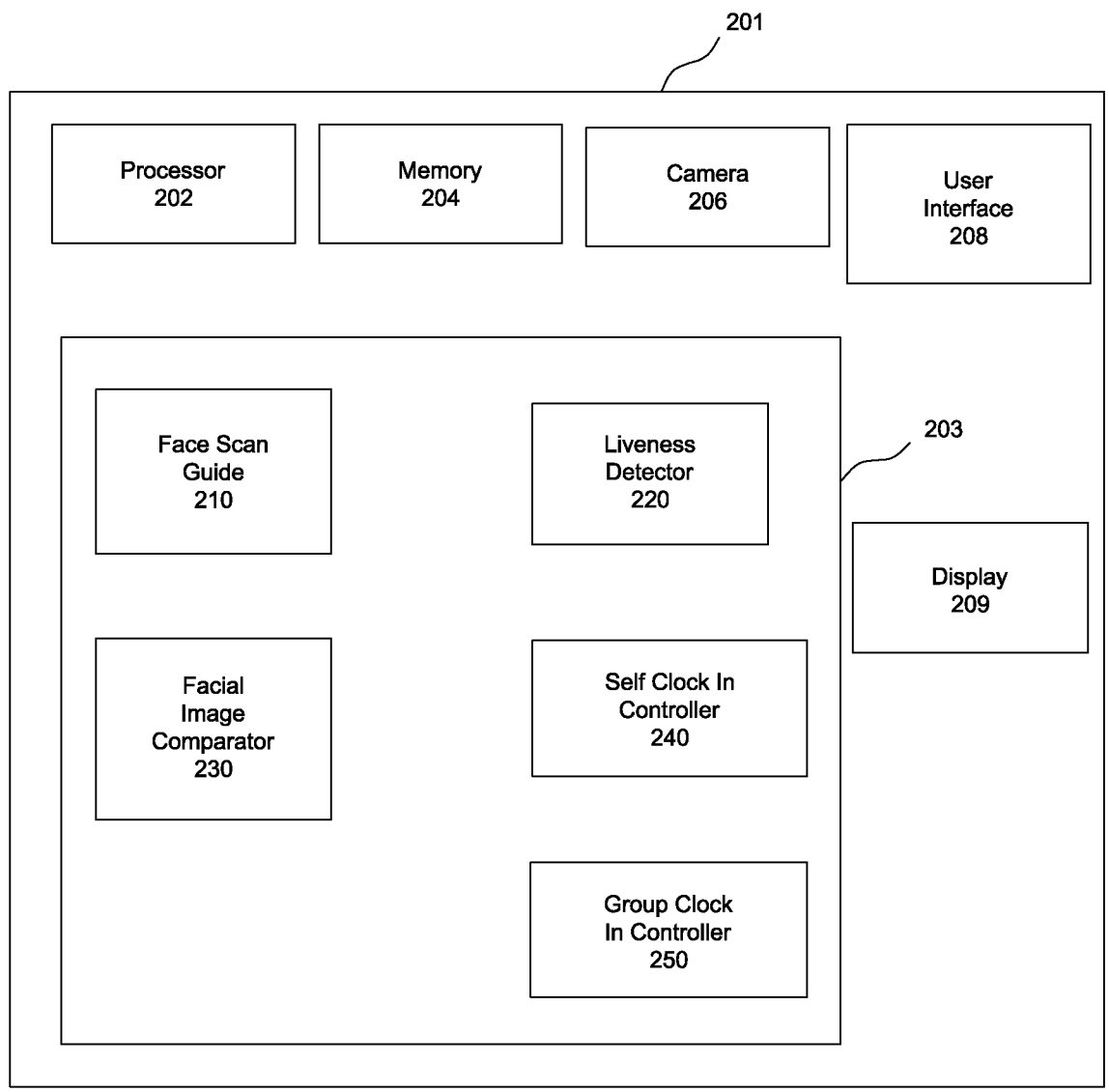
FIG. 2 is a diagram of a clock in device for self clock in and group clock in according to an embodiment.

FIG. 2 is a diagram of a clock in device 201 having a clock in assistant 203 according to an embodiment. Clock in device 201 may be implemented on a computing device. Clock in assistant 203 (and any of its components 210-250) may be implemented in software, firmware, hardware, or any combination thereof on clock in device 201. In embodiments, clock in assistant 203 may be implemented as an application. The term application as used herein refers to an installed application, a web application, or other type of application capable of performing functionality on a computing device. For example, clock in assistant 203 may be configured as an application installed on a computing device or may be a web application operated through a browser on each computing device. A computing device as used herein may be any type of computing device having a processor and computer readable memory, including but not limited to, smartphone, laptop computer, tablet computer, desktop computer, game console, set-top box, kiosk, smart appliance, or embedded system.

In one embodiment, clock in device 201 includes one or more processors 202, memory 204, one more digital cameras 206, user interface 208 and display 209. User interface 208 may be a graphical user interface, voice activated user interface or other type of user interface. Display 209 may be a touch screen display, flat panel display, projector, or other type of computer display. Accelerometers, input/output units (e.g., speaker, microphone), ports and communications units for wireless or wired data communications (e.g., transceivers, network interfaces), GPS chips, and other sensors or components may be included.

Clock in assistant 203 includes face scan guide unit 210, liveness detector 220, facial image comparator 230, self clock in controller 240 and group clock in controller 250. Face scan guide unit 210 generate face guides for guiding a scan of a face within a field of view of camera 206. Liveness detector 220 detects a liveness condition of a user engaged in a self or group clock in. Facial image comparator 230 compares encodings of captured digital images and associated stored encodings to verify a match in self clock in or recognize a set of candidates in a group clock in. Self clock in controller 240 controls operation to perform a self clock in. Group clock in controller 250 controls operation to perform a group clock in.

Clock in Manager

Figure 3:
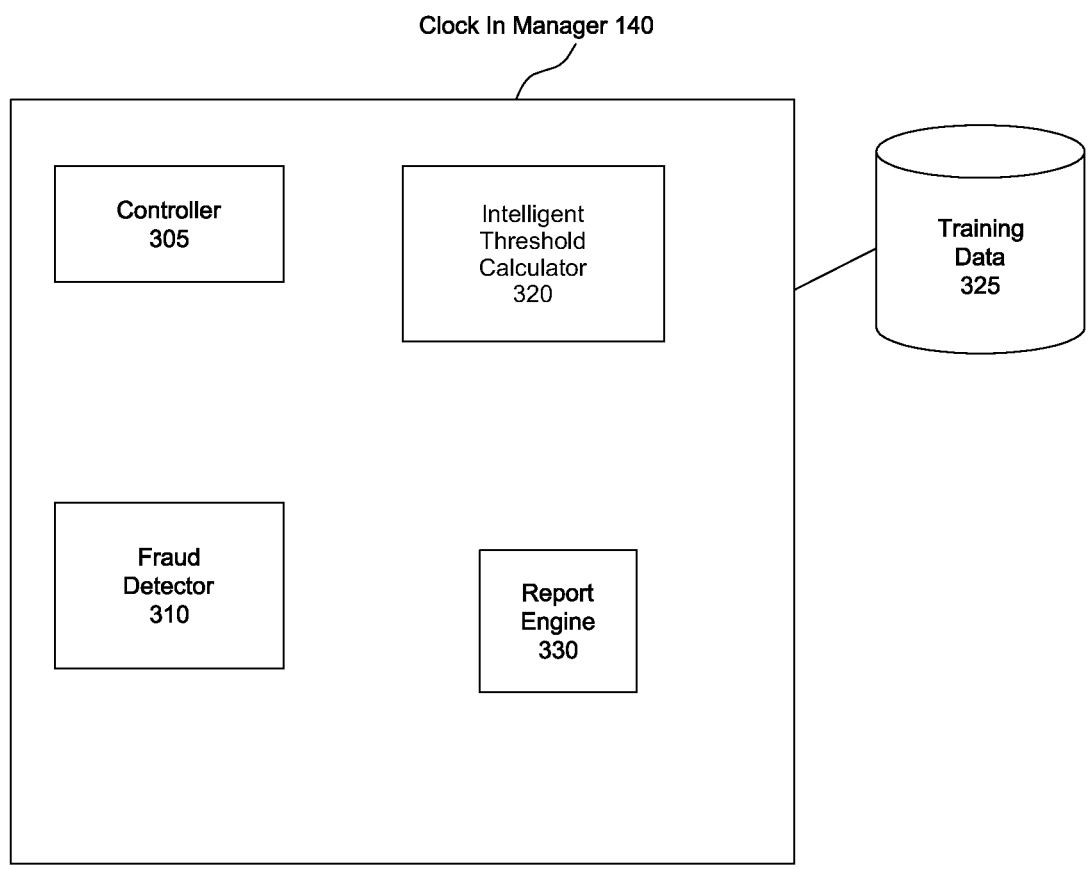
FIG. 3 is a diagram showing a clock in manager in further detail according to an embodiment.

FIG. 3 is a diagram showing a clock in manager 140 in further detail according to an embodiment. Clock in manager 140 includes a controller 305, fraud detector 310 and intelligent threshold calculator 320. Clock in manager 140 is also coupled to a database 325 having training data. Controller 305 controls operations carried out by clock in manager 140 including managing self clock in and group clock in events and synchronization of data collected in online and offline self clock in and group clock in events.

Fraud detector 310 detects different types of fraud. Intelligent threshold calculator 320 adjusts thresholds based on training data 325 according to different algorithms to balance clock in management behavior according to security and throughput needs. Report engine 330 may also be included for generating reports and performing data analytics.

Recognition and Verification

In embodiments, verification and recognition of facial images may be performed by system 100. Verification is a 1:1 problem and recognition is a 1:n problem, where n is a positive integer. For example, face verification can be thought of as a yes/no question or comparison. While face recognition aims to determine a name (from a long list of names).

In embodiments, system 100 may use verification of facial images for self clock in and recognition for group clock in. In one embodiment, one or two tuning algorithms for verification and one tuning algorithm for recognition are used. Masks may be applied to set a tradeoff between recognition accuracy and verification accuracy.

Finally, it is difficult to attack or fraudulently perform clock in in a verification mode. For a user, it is difficult for to say "I am Robson" as part of a self clock in and successfully pass verification. The fraudulent user (imposter) won't know a priori which person in the database matches his or her face. So, the user will have to try many names and could be caught doing so by a manager or blocked with straightforward security checks, such as, a maximum of three tries allowed. Also a self clockin may be performed with a user's smartphone or other device which already knows who you are and has security protections against unauthorized use built into the operating system. So, when an authorized user (named Mithun) self clocks in with his or her face on their smartphone, a question asked is: "Is this face Mithun's?". And the only answer needed is yes (self clock in verification succeeded), or no (self clockin verification failed).

But with recognition, a 1:n determination is made rather than a 1:1 comparison of facial images. Because in a group clock in mode another user, such as a manager, is performing the group clock in of others, an imposter recognition rate may be set higher than for a self clock in because the manager or site discourages fraudulent clock in by imposters in the group. Allowing a higher imposter recognition rate may allow faster throughput of workers in groups at a clock in device.

Operation

The operation of each of the components of FIGS. 1-3 is described in further detail below with respect to the computer-implemented processes and examples in FIGS. 4-22.

Figure 4:
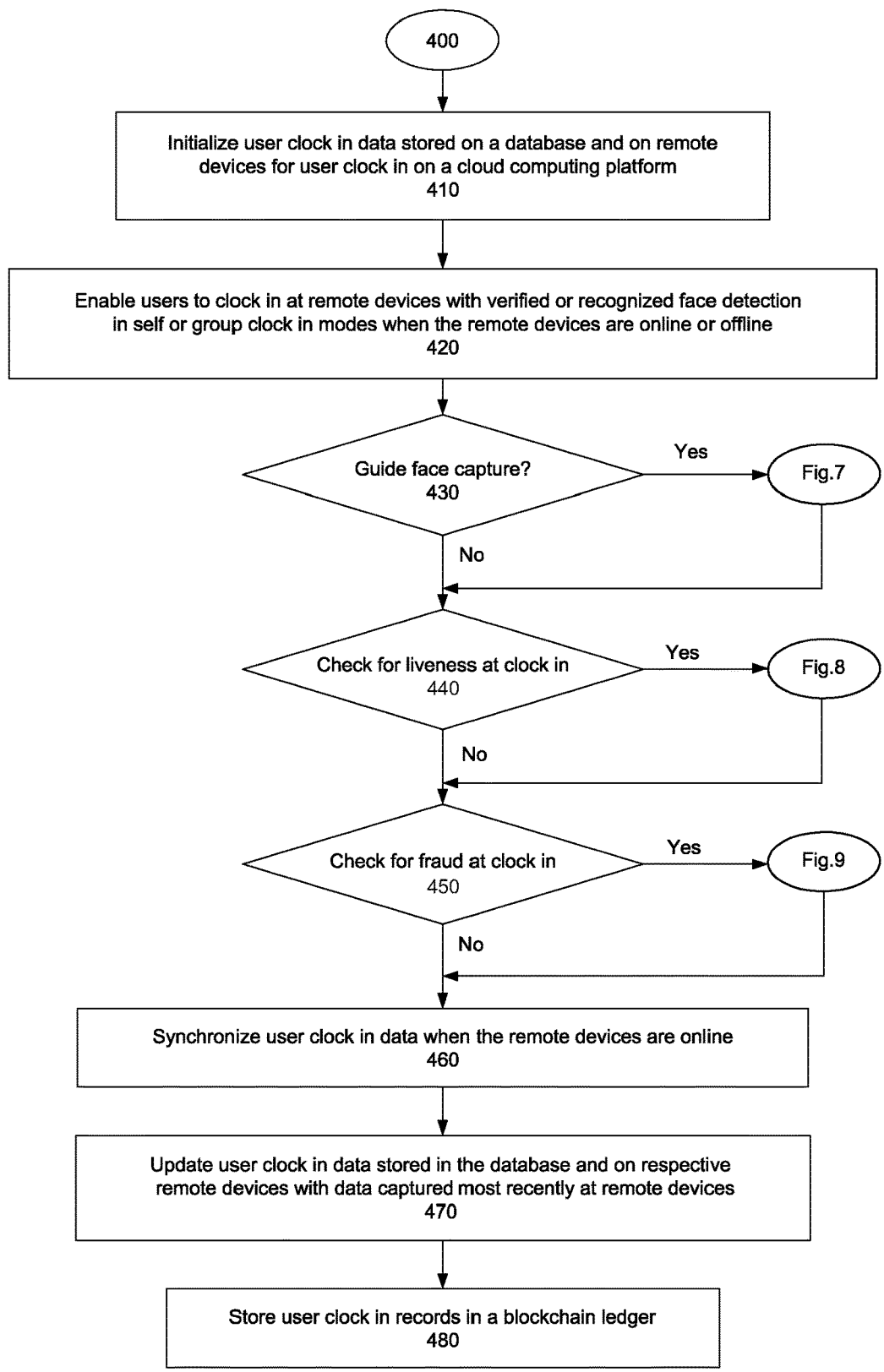
FIG. 4 is a flowchart of a process for synchronized online/offline clock in management according to an embodiment of the present invention.

FIG. 4 is a flowchart of a process for synchronized online/offline clock in management 400 according to an embodiment of the present invention (steps 410-480). Process 400 may be carried out by system 100 in particular by platform 120 and one more clock in devices 201 with clock in assistants 203.

In step 410, system 100 initializes user clock in data stored on platform 120 and on remote clock in devices 201. User clock in data may be stored in a record in a database or memory. In one embodiment, as shown in Table 1, user clock in data may include personnel data for a user (such as an employee name or ID number), a digital facial image and an associated encoding. The associated encoding is representative of the digital facial image. Clock in event data may also be included. Clock in event data may include a date and time stamp of a clock in event. Clock in event data may also include indication of the type of clock in, namely, whether the clock in was a self or group clock in event.

TABLE 1

| USER CLOCK IN RECORD |
|---|
| PERSONNEL DATA |
| FACIAL IMAGE |
| ENCODING |
| CLOCK IN EVENT DATA |

In one example, each digital facial image is represented by a digital encoding made up of an array data structure composed of 128 floating point numbers. The encoding may be a one-way hash, one-way signature, or fingerprint representative of at least a facial region of the digital image. In this way, the encoding uniquely (or substantially uniquely) represents the digital image with fewer bits of data than the entire digital image itself. Encoding may also be referred to as encoding data, face encoding, face embedding, or face DNA. In one example, an open source technique may be used to generate the 128 floating point numbers for each face. Also, because face encodings are just 128 floating numbers, even when the number of personnel is large, system 100 is able to keep the size of a database of user clock in records having face encoding data small.

User clock in data may be initially captured by HR at an enrollment or in periodic follow up enrollments. For example, at the time or hire or enrollment, HR team 2202 may capture personnel data and a facial image using a computing device 2205 coupled to HR system 130. HR system 130 may then store the captured personnel data and facial image as a user clock in record on a database 132 coupled to HR system 130. Similar enrollment operations may be performed for contractors or approved guests or visitors to initialize similar respective user clock in records in system 100.

Initialization may load initial user clock in records onto one or more clock in devices 201. For example, during initialization, authorized user clock in records captured securely by HR team 2202 may be downloaded for storage on respective users' remote devices. In this way, initial user clock in data is made available for self or group clock in on online or offline remote devices 201. This can help jumpstart self clock in and group clock in operation.

For example, when clock in assistant 203 is activated by processor 202 for self clock in by a user and a corresponding user clock in record has not already been downloaded to memory 204, self clock in controller 240 may request the corresponding user clock in record from clock in manager 140. Depending upon where the user clock in record is stored on platform 120, clock in manager 140 may return the user clock record if available locally at database 142 or may request the user clock in record from data storage manager 160 coupled to database 162 or from HR system 130 coupled to database 132.

Similarly, at initialization, user clock in records for users expected at a location managed by an authorized user may be downloaded to a remote clock in device 201. For example, when clock in assistant 203 is activated by processor 202 for group clock in by an authorized user and corresponding user clock in records of users have not already been downloaded to remote device 201, group clock in controller 250 may request the corresponding user clock in records from clock in manager 140. Depending upon where the user clock in records are stored on platform 120, clock in manager 140 may return the user clock records if available locally at database 142 or may request the user clock in records from data storage manager 160 coupled to database 162 or from HR system 130 coupled to database 132.

This initialization allows at least some initial user clock in records to be present on remote clock in devices 201 and locally stored in memory 204 to support subsequent self or group clock in even when the remote devices are later offline at clock in. In a feature, at initialization, the facial image and encoding in the user clock in record may be the authorized digital facial image and encoding captured at enrollment. User clock in event data may be initialized to the date and time of the enrollment when the facial image was captured or the time of download to a mobile device during initialization.

As described below, in a further feature, after initialization as operation proceeds for multiple clock in events and synchronization is carried out, user clock in records may include a set of most recent user clock in data stored locally in memory 204. This makes subsequent clock ins occur reliably and quickly even when clock in devices 201 are offline.

In step 420, system 100 enables users to clock in at remote devices 201 with verified or recognized face detection in self or group clock in modes when the remote devices 201 are online or offline.

In an embodiment, clock in assistant 203 may be used to perform a self clock in or a group clock in. Self clock in controller 240 may control operation of clock in device 201 to carry out self clock in. Self clock in is described further below respect to FIG. 5. Group clock in controller 250 may control operation of clock in device 201 to carry out group clock in. Group clock in is described further below respect to FIG. 6.

In one example, clock in assistant 203 before generating encoding for a face, runs a Face Detection (FD) algorithm to first detect a face in the image. A technique based on HoG (Histogram of Gradients) may be used to detect faces. Alternatively, a CNN-based face detector may be able to detect faces. This may be advantageous in certain applications where increased technical accuracy in face detection is needed. The inventors recognized this may be the case, for example, where a user wears a facial mask or other facial covering at clock in. Other cases may occur when a user's face is turned or tilted and/or is in poor lighting conditions.

Figure 7:
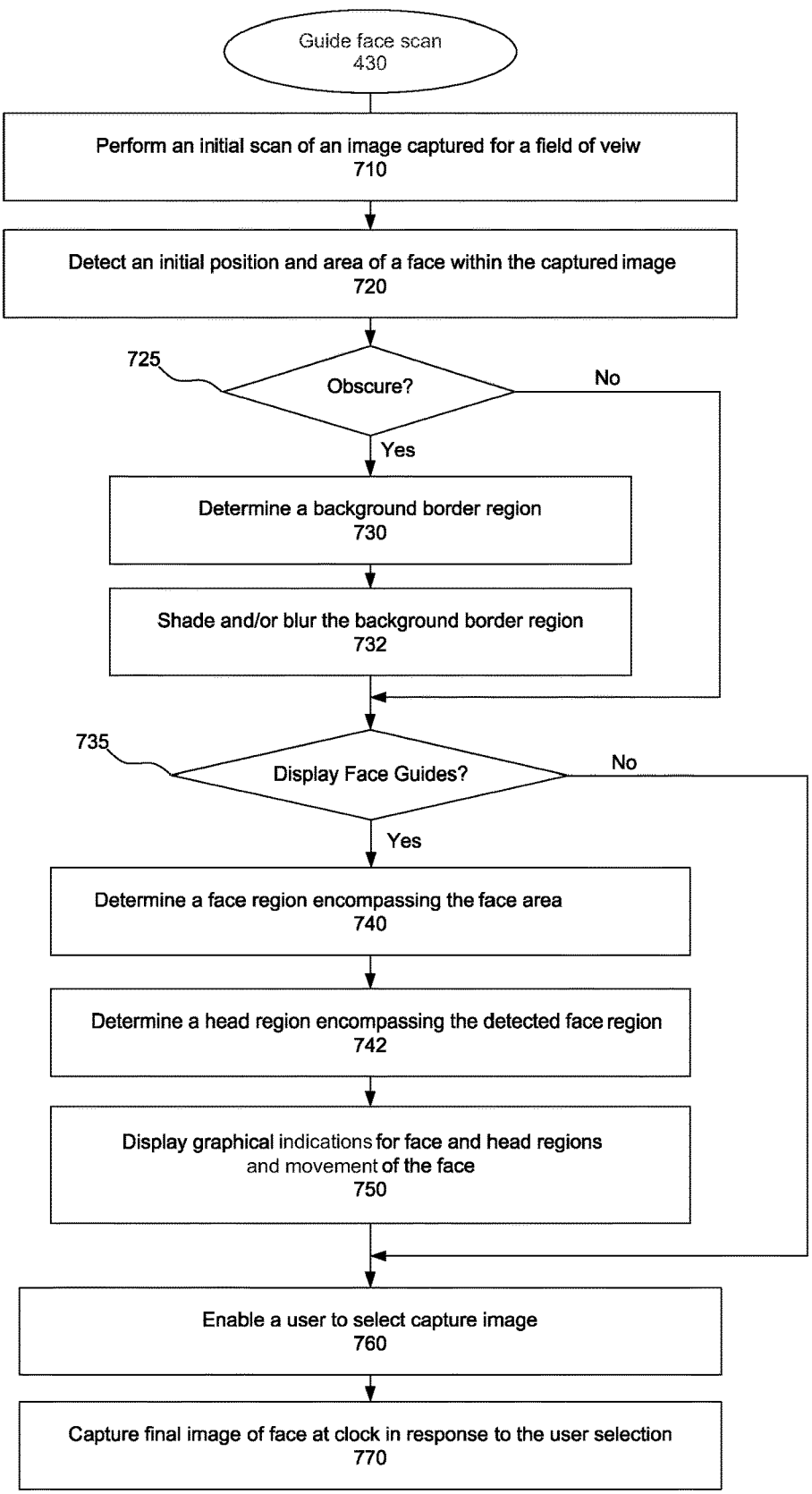
FIG. 7 is a flowchart of a process for guiding a face scan according to an embodiment of the present invention.

In step 430, a check is made to determine whether a face guide capture is to be made. If yes, control proceeds to provide a face guide for capture of a facial image (FIG. 7, steps 710-770). For example, face guide unit 210 may generate a face guide for capture of a facial image through clock in assistant 203 on clock in device 201. If no, control proceeds to step 440. Controllers 240 or 250 control carrying out step 430 depending upon whether a self clock in or group clock in mode is performed.

Figure 8:
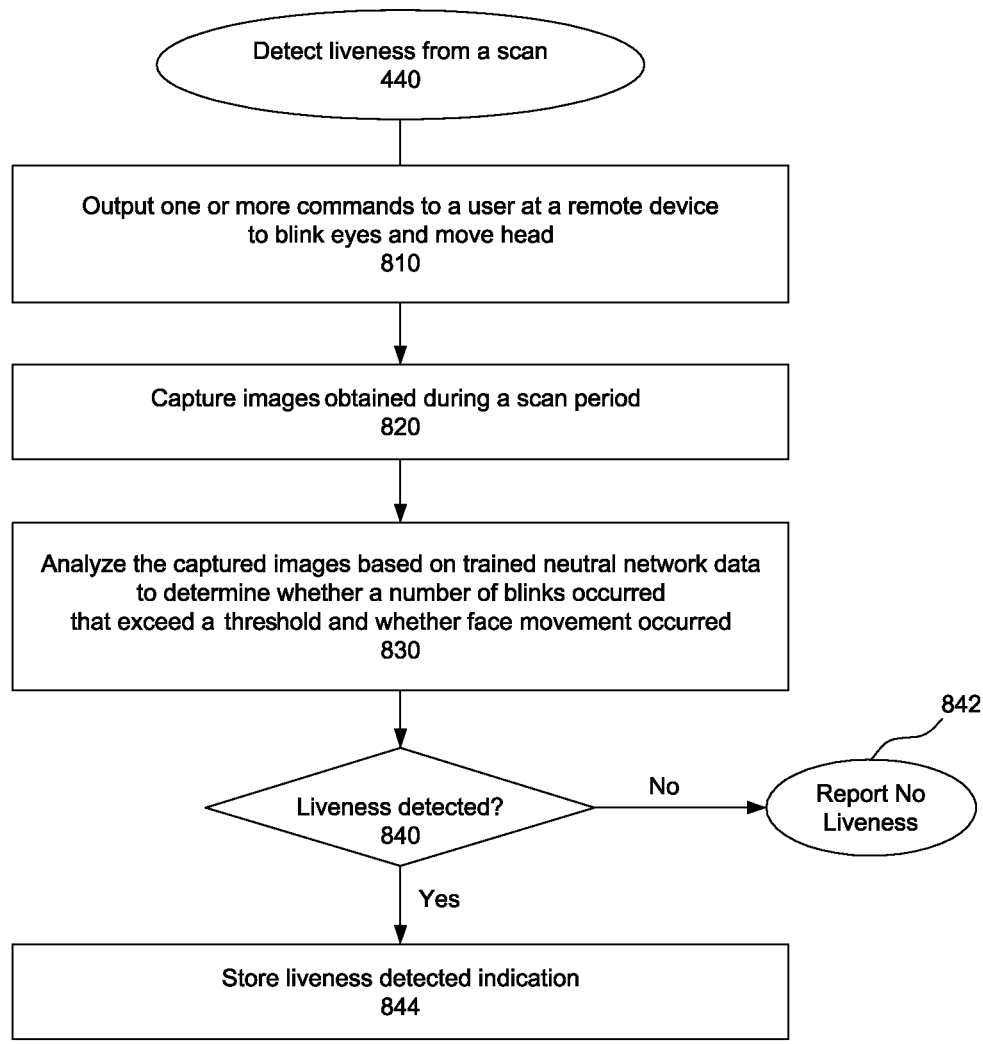
FIG. 8 is a flowchart of a process for detecting liveness in a face scan according to an embodiment of the present invention.

In step 440, a check is made to determine whether liveness is to be checked. If yes, liveness is to be checked, then control proceeds to check for liveness (FIG. 8, steps 810-844). For example, liveness detector 220 may detect liveness during capture of a facial image through application 103 on mobile device 102. If no, control proceeds to step 450. Controllers 240 or 250 control carrying out step 440 depending upon whether a self clock in or group clock in mode is performed.

Figure 9:
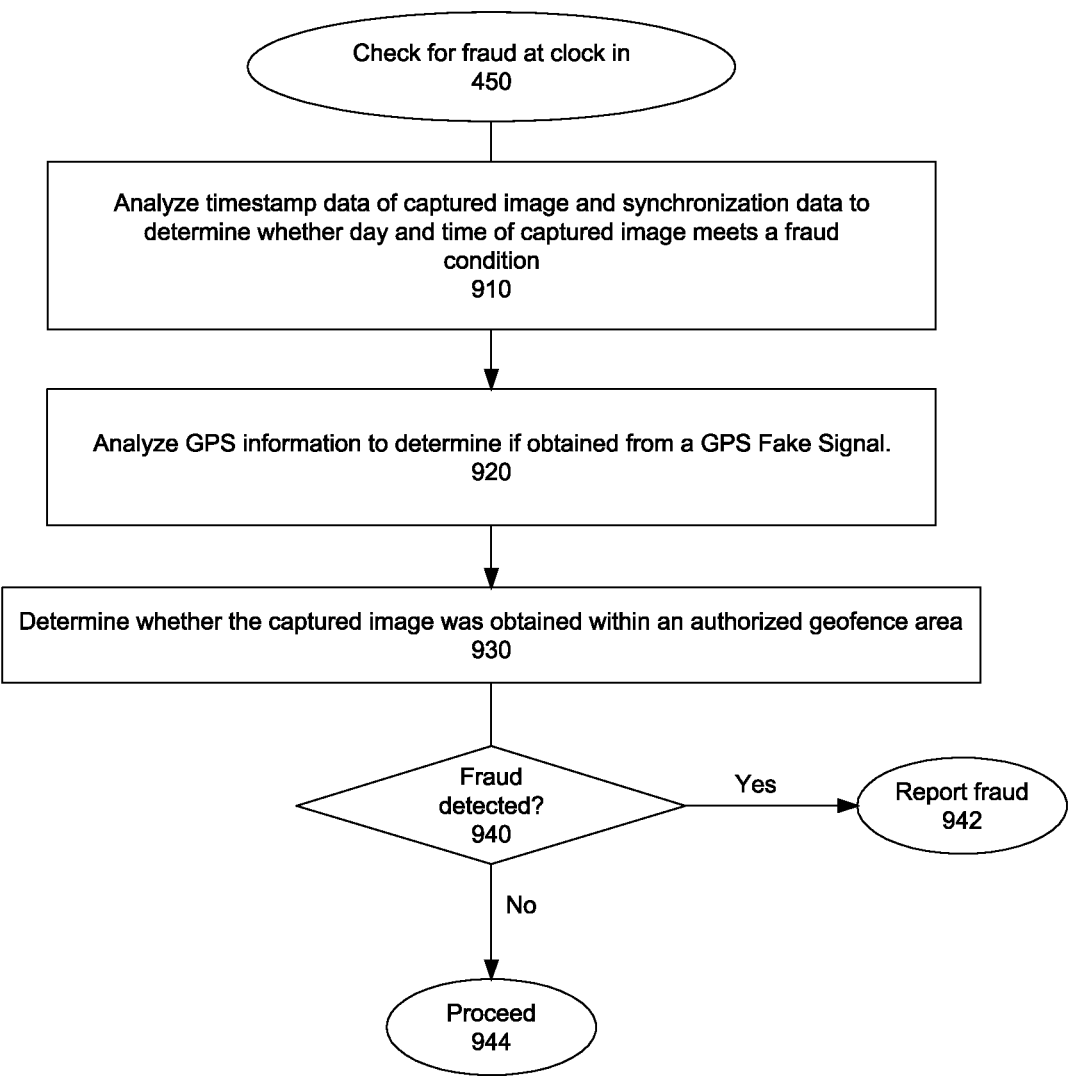
FIG. 9 is a flowchart of a process for detecting fraud in a clock in according to an embodiment of the present invention.

In step 450, a check is made to determine whether fraud is to be checked. If yes, fraud is to be checked, then control proceeds to check for fraud (FIG. 9, steps 910-944). If no, control proceeds to step 460. For example, clock in manager 140 has a fraud detector 310 to detect fraud in a clock in event. Fraud detection may occur during a clock in when device 201 is online and in communication with clock in manager 140. Alternatively, fraud detection may occur after a clock in by an offline device 201, when the device 201 returns online and is synchronized with clock in manager 140.

In step 460, system 100 synchronizes user clock in data when the remote devices are online. In this way, user clock in data may be captured in self clock in or group clock in when remote devices 201 are offline or online. User clock in data captured when devices 201 are offline may then be synchronized with data on platform 120 when devices 201 return to online.

Synchronization may be initiated in different ways. Clock in assistant 203, and in particular, self clock in controller 240 or group clock in controller 250, may send a sync clock in request 2210 to clock in manager 140 as shown in FIG. 22. Sync clock in request 2210 may include a number of most recent user clock in records captured at a device 201 in self clock in or group clock in modes. Clock in manager 140 may compare the most recent user clock in records received with or associated with sync clock in request 2210 with copies already stored in database 142. Any new most recent user clock in records sent from clock in device(s) 201 can be added to database 142. Likewise, any more recent user clock in records at database 142 may be returned to device 201. In this way, platform 120 maintains synchronized copies of most recent user clock in records on one more devices 201 and at database 142 under the control of clock in manager 140.

Online sync connector 150 may also initiate synchronization of user clock in records to ensure synchronization between user clock in records managed by data storage manager 160 and clock in manager 140. Data storage manager 160 may also validate user clock in data against authorized user clock in data in HR system 130.

For example, as shown in FIG. 22, online sync connector 150 may send a sync data request 2230 to clock in manager 140 to initiate synchronization. Online sync connector 150 may also send a request 2240 to data storage manager 160. Request 2240 may include a request to get any needed user clock in records (such as personnel data and digital facial images (and encodings)) previously captured and verified by HR team 2202.

In response to request 2240, data storage manager 160 sends a data validation request 2250 to check a matching previously stored record input to the HR system 130. Data storage manager 160 then sends a clock in synchronization message 2260 to clock in manager 140. Upon receipt of a clock in sync message 2260 and sync clock in request 2210, clock in manager 140 returns a sync message 2220 to clock in devices 201. The return sync message 2220 may include most recent user clock in data records so clock in device 201 under control of clock in assistant 203 have up-to-date, synchronized data with platform 120.

In step 470, system 100 updates user clock in data stored in a database on platform 120 with data captured most recently at remote devices 201. For example, clock in manager 140 may send more recent captured user clock in data for storage in a database 142 or other database such as database 162.

In step 480, system 100 stores updated user clock in data records in a blockchain ledger. In further feature, data storage manager 160 may also output any updated user clock in data records to a blockchain ledger. A blockchain ledger may be a digital ledger that stores records in blocks in a number of transactions across many computing devices. Blocks may be linked cryptographically with timestamp data making it difficult to retroactively alter a block. Public or private blockchains may be used for storage of user clock in data records.

Self Clock in

Figure 5:
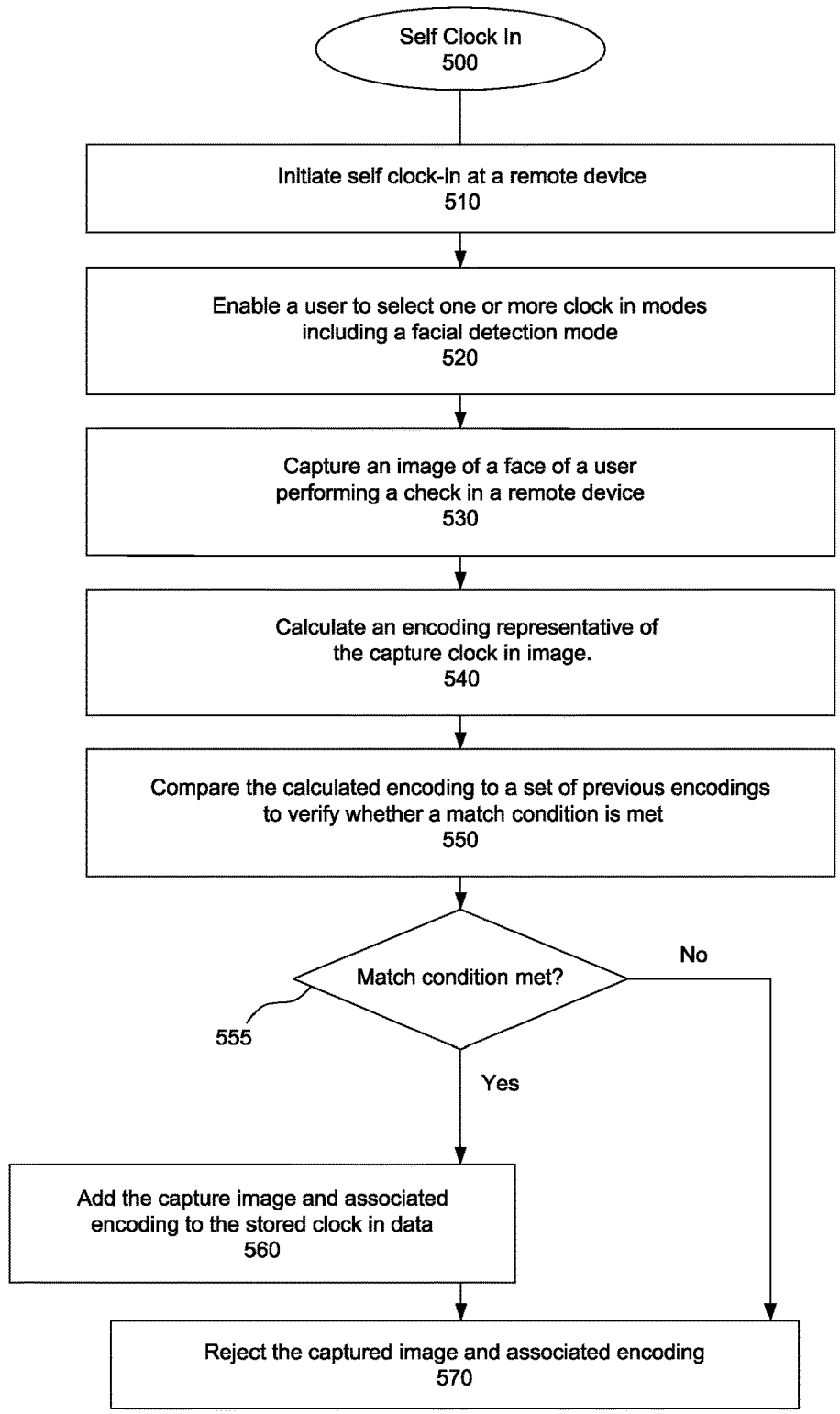
FIG. 5 is a flowchart of a process for self clock in with verification according to an embodiment of the present invention.

FIG. 5 is a flowchart of a process 500 for self clock in with verification according to an embodiment of the present invention (steps 510-570). In an embodiment, process 500 may be carried out under the control of self clock in controller 240 when clock in assistant 203 is on. For brevity, process 500 is also described with respect to examples shown FIG. 15. FIGS. 15A-15E illustrate example display panels that may be displayed by clock in assistant 203 during self clock in operations at a remote device.

In step 510, self clock in is initiated. Clock in assistant 203 may be activated by clock in device 201.

Figure 15A:
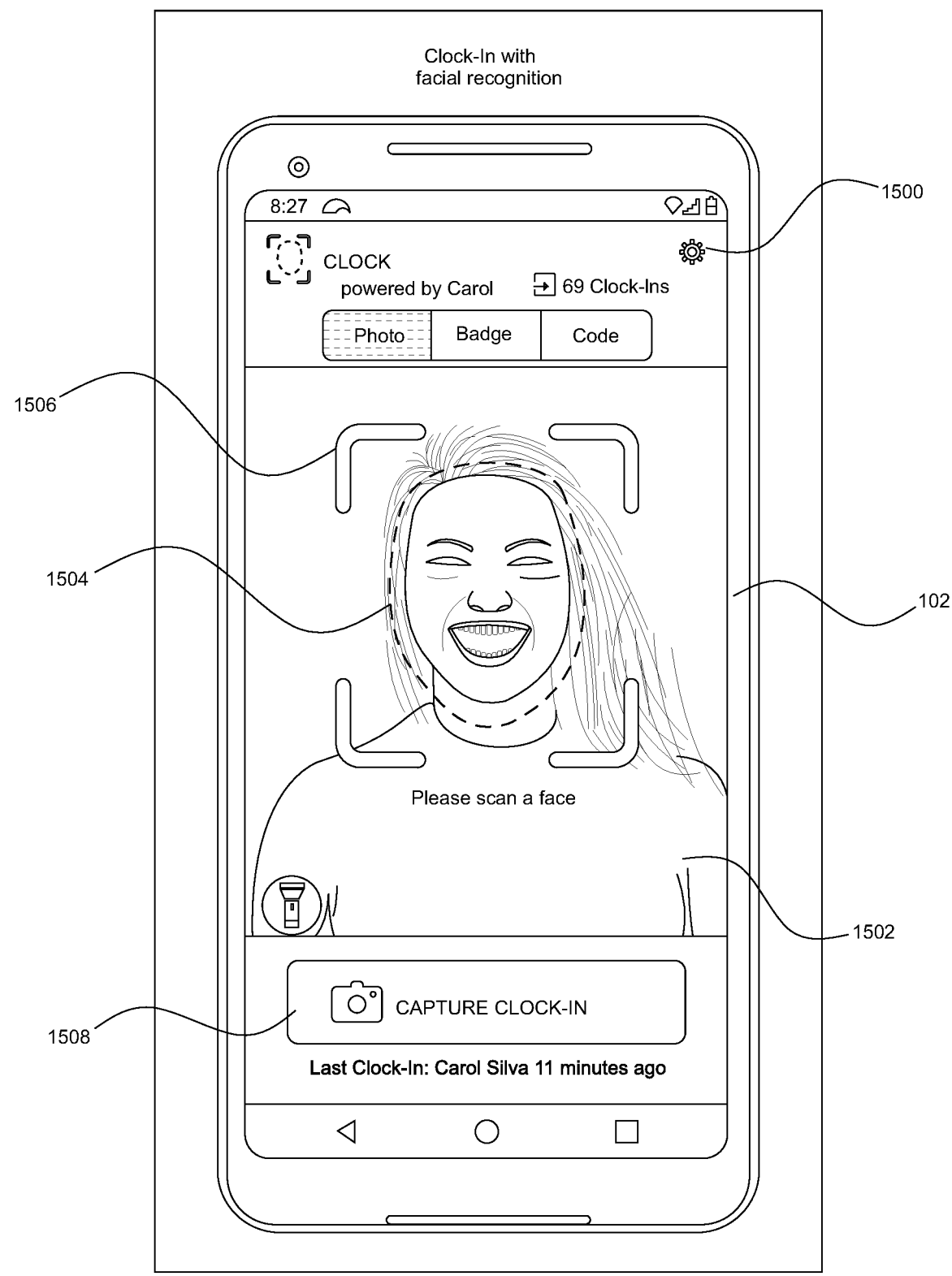
Figure 15B:
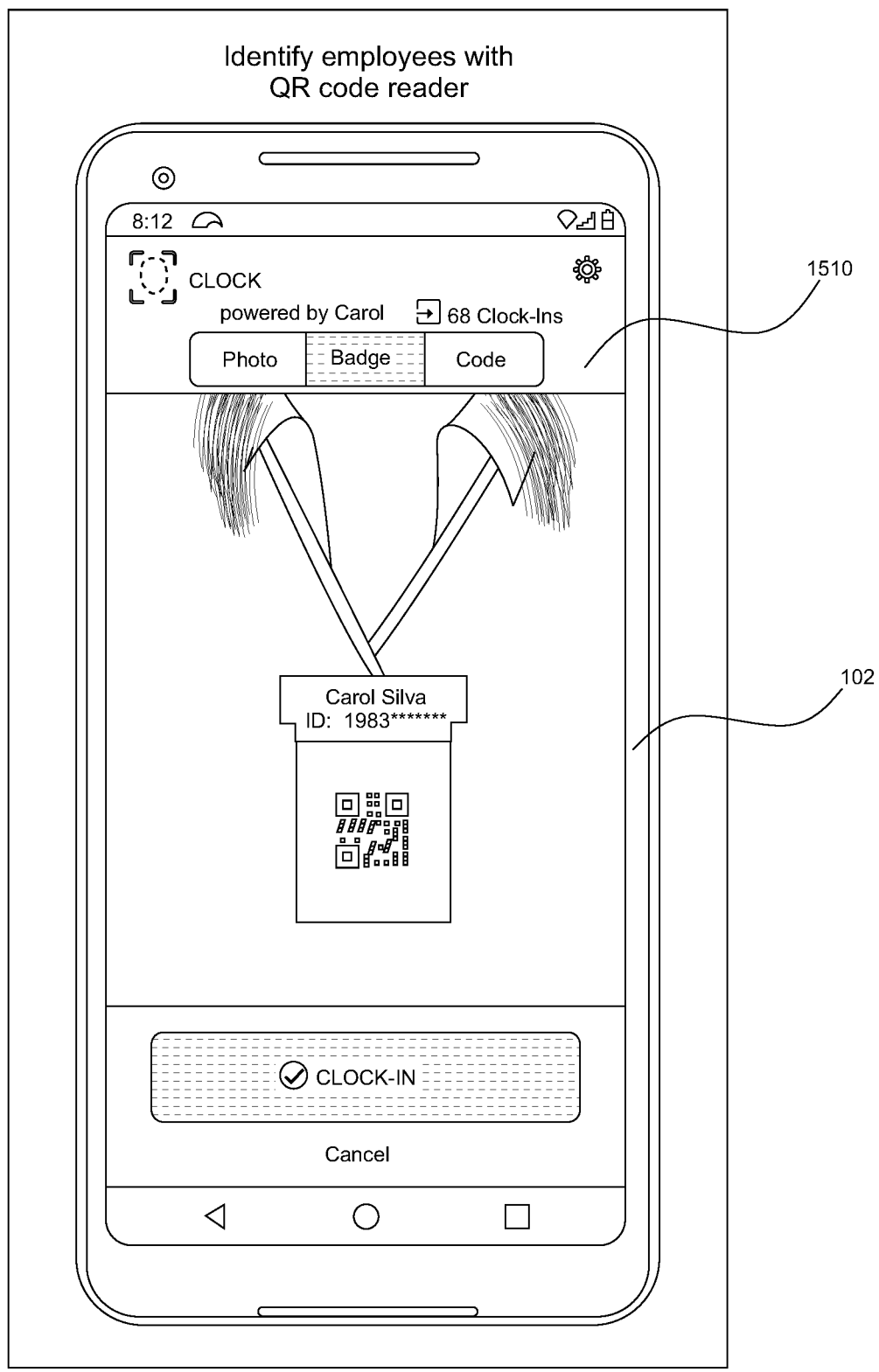

In step 520, a user is enabled to select through user interface 208 one or more clock in modes including a facial detection mode. As shown in FIG. 15A, clock in assistant 203 may present a self clock in panel 1500 on display 209. Self clock in panel 1500 includes tabs for selecting a photo, badge, or code type of input for the self clock in mode.

If a photo tab is selected, an area 1502 of the display shows an image of a field of view of camera 206. Display area 1502 may also display instructions for the user, such as, "Please scan a face."

Face placement guides 1504, 1506 may also be generated and displayed by face guide unit 210 to facilitate placement of the face of a user at a proper location within the camera field of view during self clock in. An oval 1504, such as, a colored dashed line may be displayed in the center of display area 1502. A set of four corners 1506 may also be provided in area 1502. When a user places his or her face in the camera field of view it appears in the display area 1502. Corners 1506 help a user move his or her head so it is properly positioned within the area bounded by the corners. Oval 1504 helps the user move his or her face to be properly positioned within the oval area which helps provide more accurate positioning of the face for facial detection.

Once a face is positioned, an image of the user's face is captured (step 530). A user may select a button 1508 to manually initiate capture of the image. Digital camera 206 then captures a digital image of the user face (also called a facial image) and stores the facial image in memory 204 (such as in a database stored in memory 204).

In step 520, a user may also select a tab for input of data from a badge (such as reading a QR code on a badge with a QR code reader). Clock in assistant 203 may then display a panel 1510 (FIG. 15B) with data showing at least part of the personnel data read from the badge (such as employee name). This provides feedback to the user viewing panel 1510 that the QR code was read correctly. Clock in assistant 203 can then accept the data automatically or in response to a confirmation by the user.

Figure 15C:
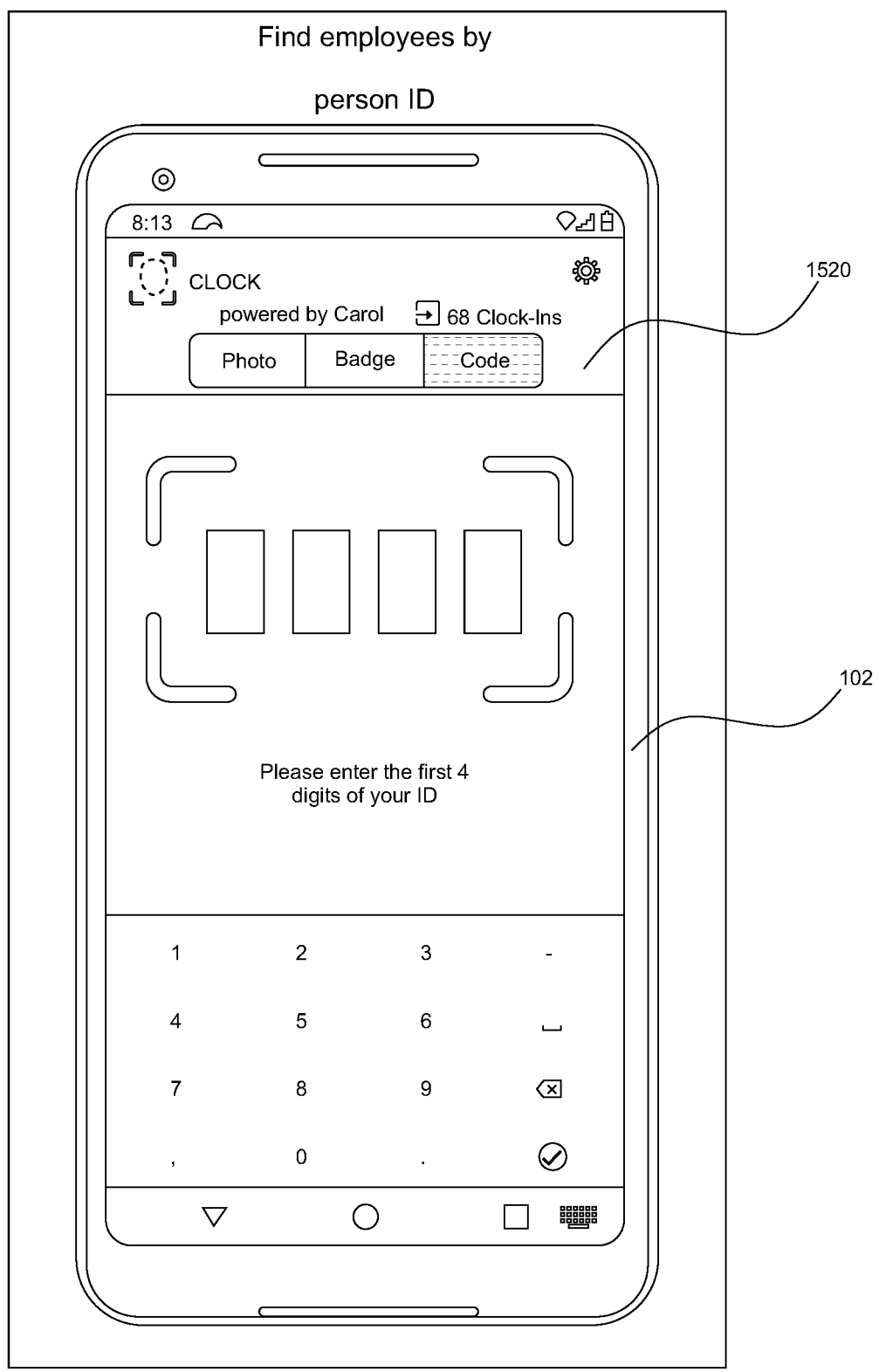

Similarly, in step 520, a user may also select a tab for input of data (such as inputting an employee code through a keypad in a code input area 1520, FIG. 15C). Clock in assistant 203 may then display a panel 1520 (FIG. 15C) with data showing at least part of the personnel data read from the badge (such as employee name). This provides feedback to the user viewing panel 1510 that the QR code was read correctly. Clock in assistant 203 can then accept the data automatically or in response to a confirmation by the user.

When a facial image has been captured in step 530, self clock in controller 240 passes control to facial image comparator 230. Facial image comparator 230 calculates an encoding representative of the facial image captured during self clock (step 540). In step 550, facial image comparator 230 compares the calculated encoding to a set of previous encodings in a user clock in data record to verify whether a match condition is met. Based on the comparison in step 550, facial image comparator 230 determines or checks whether a match condition is met (step 555). For example, a match condition may occur may when the calculated encoding of the captured image matches or substantially matches (below a threshold) one or more of the encodings in the set of previous encodings.

In the example where each encoding is an array data structure of 128 floating point numbers this comparison and match determination may be performed even more quickly. In one feature, the previous encodings are stored locally in a user clock in data record in memory 204 on clock in device 201. In this way, facial image comparator 230 may verify a match condition quickly and even when clock in device 201 is offline. Also because the comparison is comparing one encoding against a set of previous encodings (such as five most recent encodings) to verify a match the computation can be done fast on clock in devices 201 including mobile devices, such as, in less than a second so a user is not delayed or inconvenienced by a self clock in.

If no, a match condition is not met, control proceeds to reject the captured image and associated encoding (step 570). Otherwise, control proceeds and self clock in controller 240 adds the captured image and associated encoding to stored a user clock in data record in memory 204. Date and time stamp data and type of clock in may also be stored as clock in event data in the record. The stored clock in data is then sent as an update to clock in manager 140 when clock in device 201 is online, or later in a synchronization operation when an offline clock in device 201 next returns to online operation.

Regardless of synchronization, clock in assistant 203 may display a panel 1530 as shown in FIG. 15D indicating a successful clock in to the user. Panel 1530 may also show confirmatory personnel data (e.g., employee name) and self clock in data (such as, day and time of most recent self clock in). Panel 1530 may be displayed after step 560 when a match condition is met. In this way, even when a mobile device 102 is offline, a self clock in may be carried out.

In further embodiments, liveness detection by liveness detector 220 and fraud detection by fraud detector 310 may also be performed before user clock in data records are accepted and synchronized for self clock in events.

As mentioned earlier, clock in device 201 under the control of clock in assistant 203 may stores a predetermined number of captured facial images in a user clock in data record. This has a further advantage in that the most recent captured facial images are kept. This causes more accurate self clock in comparisons by facial image comparator 203 as time progresses and faces undergo cosmetic changes with age or appearance. Online and offline syncing over time is also used to maintain a predetermined number of captured facial images on clock in device(s) 201 and in a data storage database on platform 120.

Figure 15E:
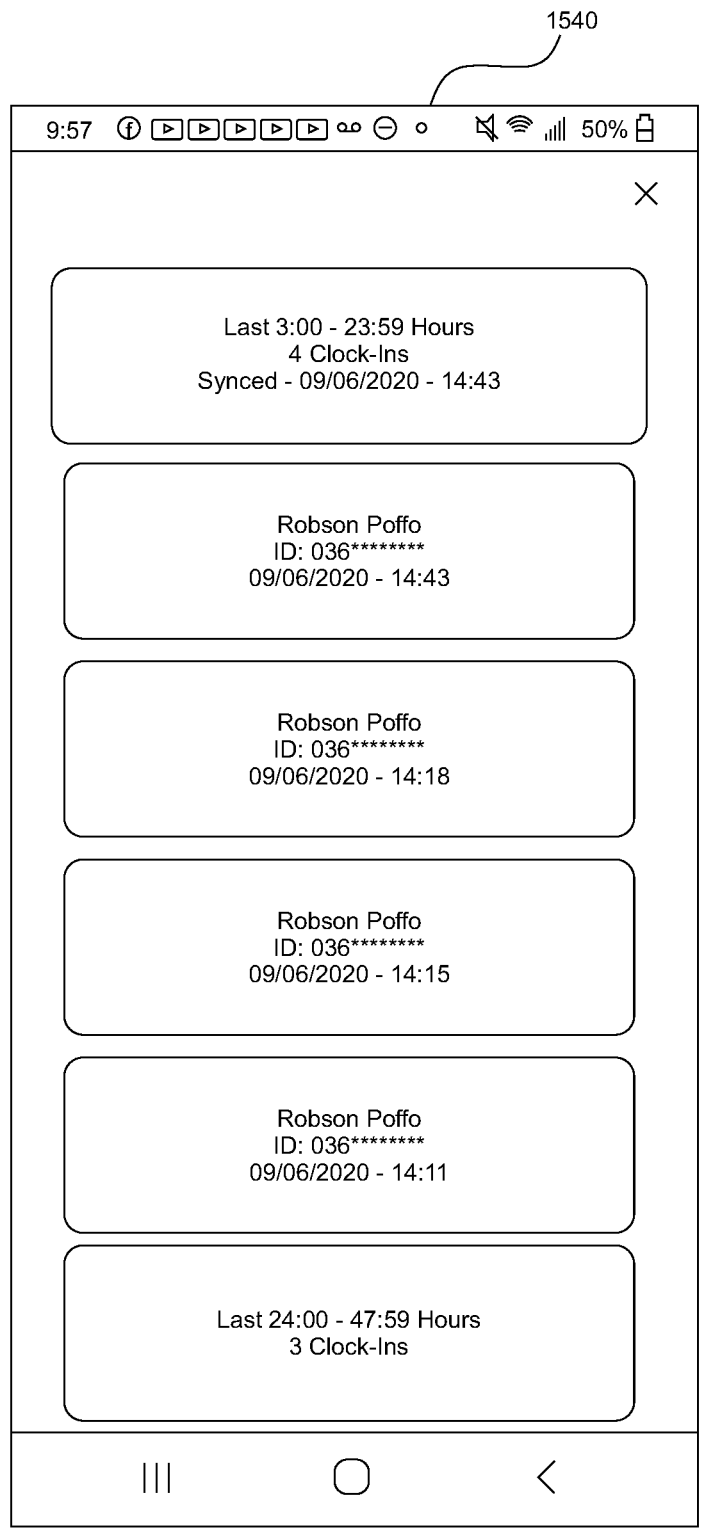

Also clock in assistant 203 may generate and display a panel 1540 summarizing most recent clock in data for different clock in events as shown in FIG. 15E. Information on the number of clock ins over a period of time and each specific clock in may be displayed. For example, panel 1540 shows summary information on recent clock ins by a user within the last 24 hours, followed by specific employee name, day and time for each clock in during that period, and summary information of clock ins by a user within the last 24 to 48 hours. In this way, at a glance a user may view recent clock in data in a glance and confirm his or her compliance with clock in requirements or time and attendance requirements of a company.

Group Clock in

Figure 6:
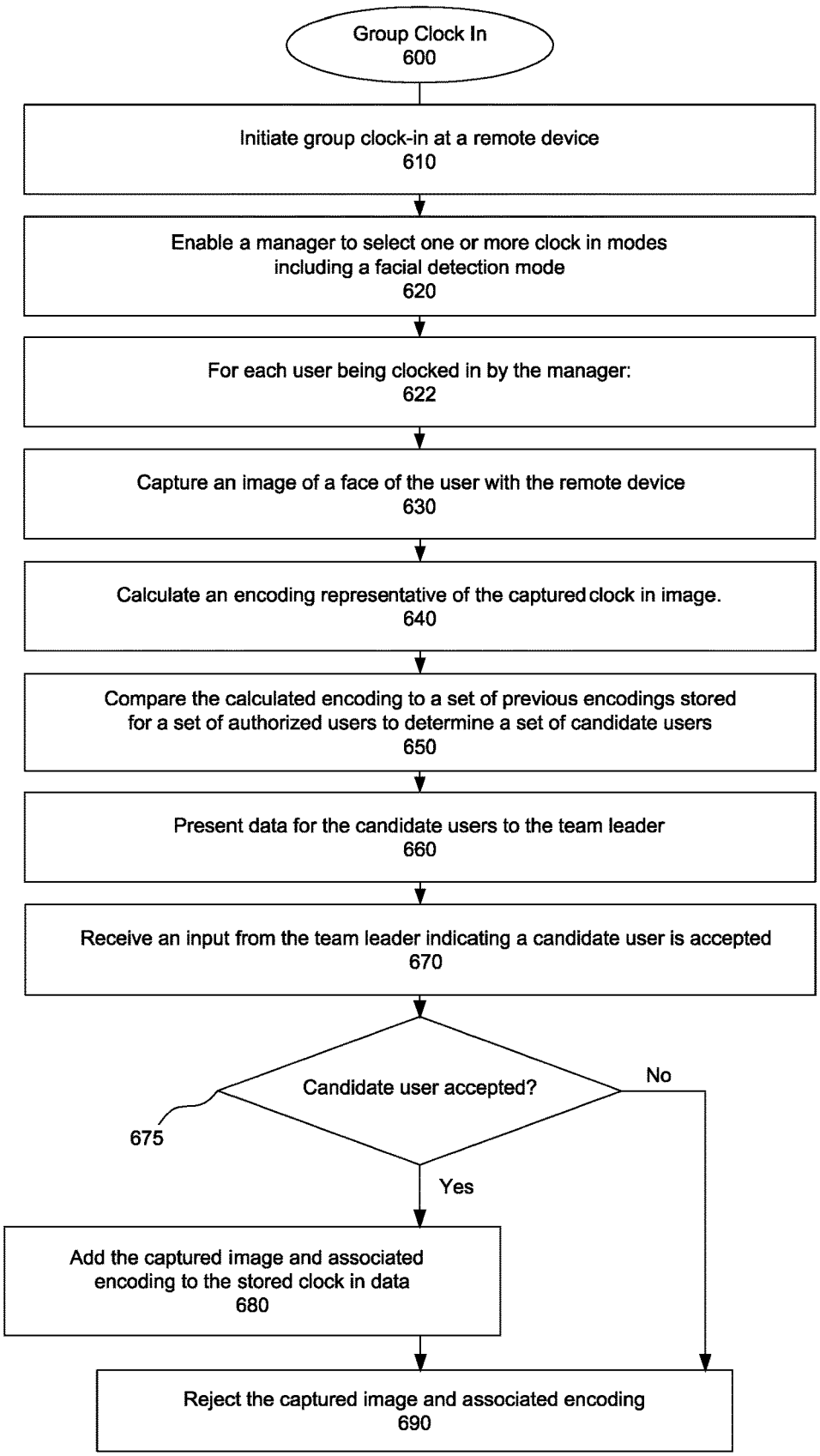
FIG. 6 is a flowchart of a process for group clock in with recognition according to an embodiment of the present invention.
Figure 16A:
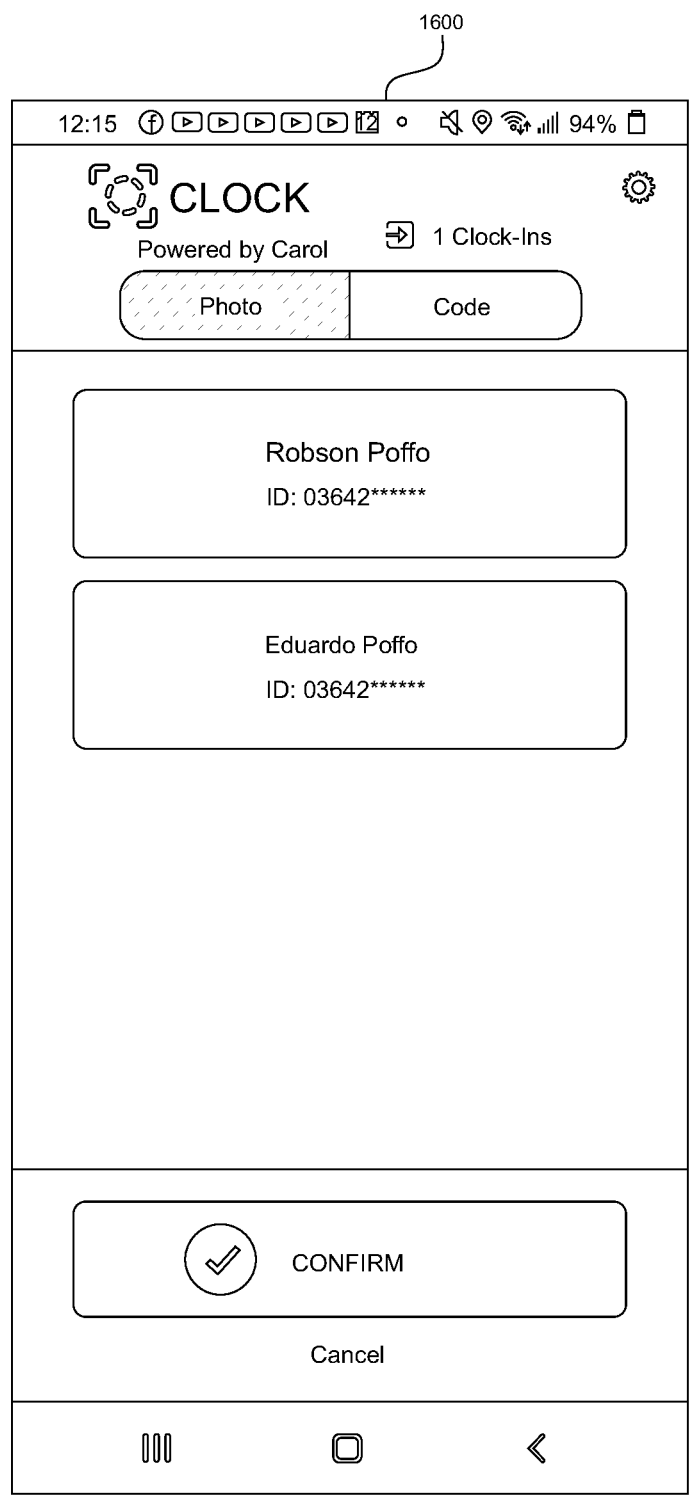
FIGS. 16A-16B illustrate images that may be displayed during group clock in operations at a remote device according to an embodiment of the present invention.
Figure 16B:
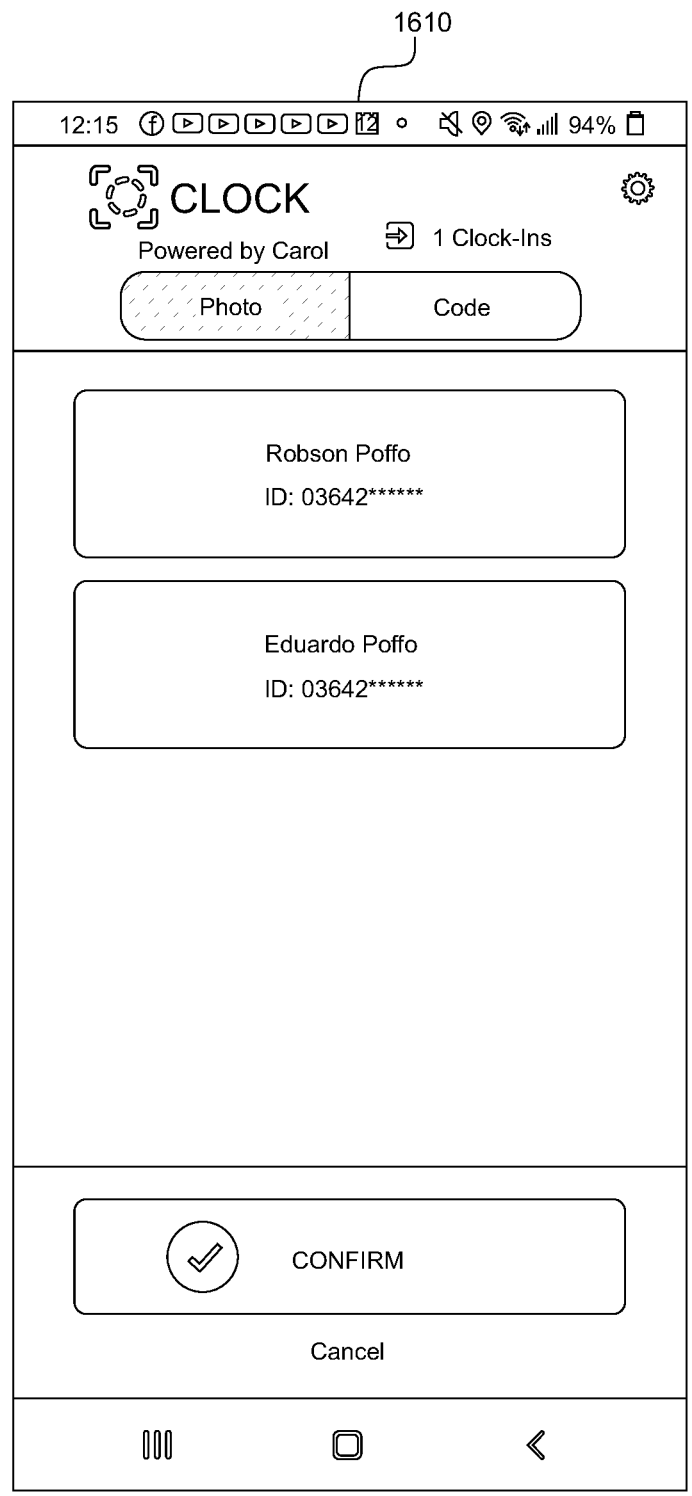

FIG. 6 is a flowchart of a process 600 for group clock in with recognition according to an embodiment of the present invention (steps 610-690). In an embodiment, process 600 may be carried out under the control of group clock in controller 250 when clock in assistant 203 is on. For brevity, process 600 is also described with respect to examples shown FIG. 16. FIGS. 16A-16B illustrate example display panels that may be displayed by a clock in assistant 203 during group clock in operations at a remote device.

In step 610, group clock in is initiated. For example, clock in assistant 203 for a group clock in may be opened by a user of clock in device 201. Unlike self clock in mode, where users typically clock in themselves, in a group clock in, a user (such as a manager, crew leader, department head or other authorized user to perform group clock in) takes on the responsibility for clocking in other users.

In step 620, a user performing group clock in is enabled to select begin a group clock in mode including a facial detection mode. In one example, clock in assistant 203 may present a group clock in panel on display 209 on clock in device 201. The panel may include tabs for selecting a photo, badge, or code type of input for the group clock in mode similar to that described above for self clock in. The authorized user performing group clock in, then selects a tab such as photo. A panel may then be displayed which has an area showing an output image of a camera field of view. The display area may also display instructions for the user to please scan a face. Face placement guides may also be displayed by clock in assistant 203 as described above for self clock in. For example, a manager carrying out a group clock may position clock in device 203 so a nearby user is in the field of view of camera 206 and properly positioned.

Once a face is positioned, an image of the user's face is captured (step 630). A user may select a button to manually initiate capture of the image. Digital camera 206 then captures a digital image of the user face (also called a facial image) and stores the facial image in memory 204 (such as in a database stored in memory 204).

In step 620, a user may also select a tab for input of data from a badge (such as reading a QR code on a badge with a QR code reader). Clock in assistant 203 may then display a panel with data showing at least part of the personnel data read from the badge (such as employee name or employee ID). This provides feedback to the user viewing panel that the QR code was read correctly. Clock in assistant 203 can then accept the data automatically or in response to a confirmation by the user. Similarly, a user may also select a tab for input of data (such as inputting an employee code through a keypad in a code input area). Clock in assistant 203 may then display a panel with data showing at least part of the employee data read from the badge (such as employee name). This provides feedback to the user viewing panel that the QR code was read correctly. Clock in assistant 203 can then accept the data automatically or in response to a confirmation by the user.

When a facial image has been captured in step 630, clock in assistant 203 and in particular facial image comparator 230 calculates an encoding (E) representative of the facial image captured during group clock in (step 640) as described above for a self clock in.

In step 650, facial image comparator 230 compares the calculated encoding to sets of previous encodings for multiple authorized users to recognize a set of candidate users. Since this is group clock in mode, the comparisons occur for previous encodings stored for sets of authorized users. The set of authorized users may be multiple users expected or approved for a particular site or group of users. To recognize user candidates, facial image comparator 230 may find one or more candidate users where comparisons with the captured encoding (E) are below a threshold T or are the top set of closest matches to the calculated encoding (E).

In one example, facial image comparator 230 may compare an encoding E to all embeddings in its database, and return a user who has most encodings in the database closest to E (distance less than threshold T). In case of multiple matches (2 or more users having same number of encoding matches), facial image comparator 230 may choose the user with lower mean score (especially if in kiosk mode and only one user match is desired to be presented) or may present all multiple matches (especially if in Team mode or where a manager is reviewing the multiple matches). One advantage of presenting multiple matches (such as 3 or so matches) for selection is that it increases accuracy in group clock in compared to only showing a top match. This makes it more likely a correct match will be selected and a legitimate user will not be incorrectly rejected.

In one feature, the previous encodings are stored locally on a clock in device 201. Clock in assistant 203 may recognize candidates quickly and even when device 201 is offline. Also because the comparison is comparing one encoding against sets of previous encodings for users the computation can be done quickly on computing devices including mobile devices, such as, less than a second so users are not delayed or inconvenienced.

In step 660, data for the determined set of candidate users is presented by clock in assistant 203 to the user performing group clock in. For example, as shown in FIG. 16A, clock in assistant 203 may output a display panel 1600 having a selectable list of names or other identification data, such as, a portion of an employee ID number, for the set of candidate users.

In step 670, the group clock in user can recognize a correct user being clocked in from the set of candidate users, select the correct user in the selectable list, and press a button or provide other input through user interface 208 to indicate the selection is confirmed. As shown in FIG. 16B, clock in assistant 203 may highlight the selected user information to provide a further indication and feedback to the group clock in user.

In step 675, clock in assistant 203 checks whether a candidate user has been accepted by the group clock in user. If yes, control proceeds to add the captured image and associated encoding to the stored clock in data (step 680). If no, control proceeds to reject the captured image and associated encoding for group clock in (step 690).

In further embodiments, liveness detection by liveness detector 220 and fraud detection by fraud detector 310 may also be performed before user clock in data records are accepted and synchronized for self clock in events.

As mentioned earlier, clock in device 201 under the control of clock in assistant 203 stores a predetermined number of captured facial images in user clock in data records. This has a further advantage in that the most recent captured facial images are kept for recognition. This causes more accurate group clock in comparisons by facial image comparator 203 as time progresses and faces undergo cosmetic changes with age or appearance. Online and offline syncing over time is also used to maintain a predetermined number of captured facial images on clock in device(s) 201 and in a data storage database on platform 120.

Face Scan Guide

FIG. 7 is a flowchart of a process 430 for guiding a face scan according to an embodiment of the present invention (steps 710-770). In one embodiment, process 430 including steps 710-770 are carried out under the control of clock in assistant 203, and in particular, face scan guide 210. A stored digital image of a camera field of view is scanned (step 710). In step 720, face scan guide 210 processes image data in the initial scan and detects an initial position and area of a face within the captured image. For example, a face detection algorithm may be used to detect the face within the digital image based on color and color variation between pixels or blocks of pixels within the image. Once the face is detected, an initial position for the face and an area encompassing the face may be determined.

In step 725, face scan guide 210 checks whether to obscure a background border region. If no, control proceeds to step 735. If yes, a background border region is determined (step 730). For example, the background border region maybe an area outside the area encompassing the face. This area may be the entire area outside the face or a portion of the area outside the face including the region nearer to the border of the image. In step 732, the background border region may be shaded or blurred when rendered for display. In this way, a user at self clock in or group clock in may more quickly identify a face and facilitate placement of the face within a camera field of view.

Figure 18:
FIG. 18 illustrates a screenshot image of an obscured background border that may be displayed during a clock in according to an embodiment of the present invention.

FIG. 18 illustrates an example image 1800 having an obscured background border region 1810 that may be displayed during a clock in according to an embodiment of the present invention. The pixels in background border region 1810 are blurred or rendered at a lower resolution compared to an interior area having a face which rendered at a higher resolution, this example is illustrative. Color, opacity, translucency, resolution or other visual effects may be used by face scan guide 210 to obscure background border region 1810 compared to the interior area having a face.

Figure 17A:
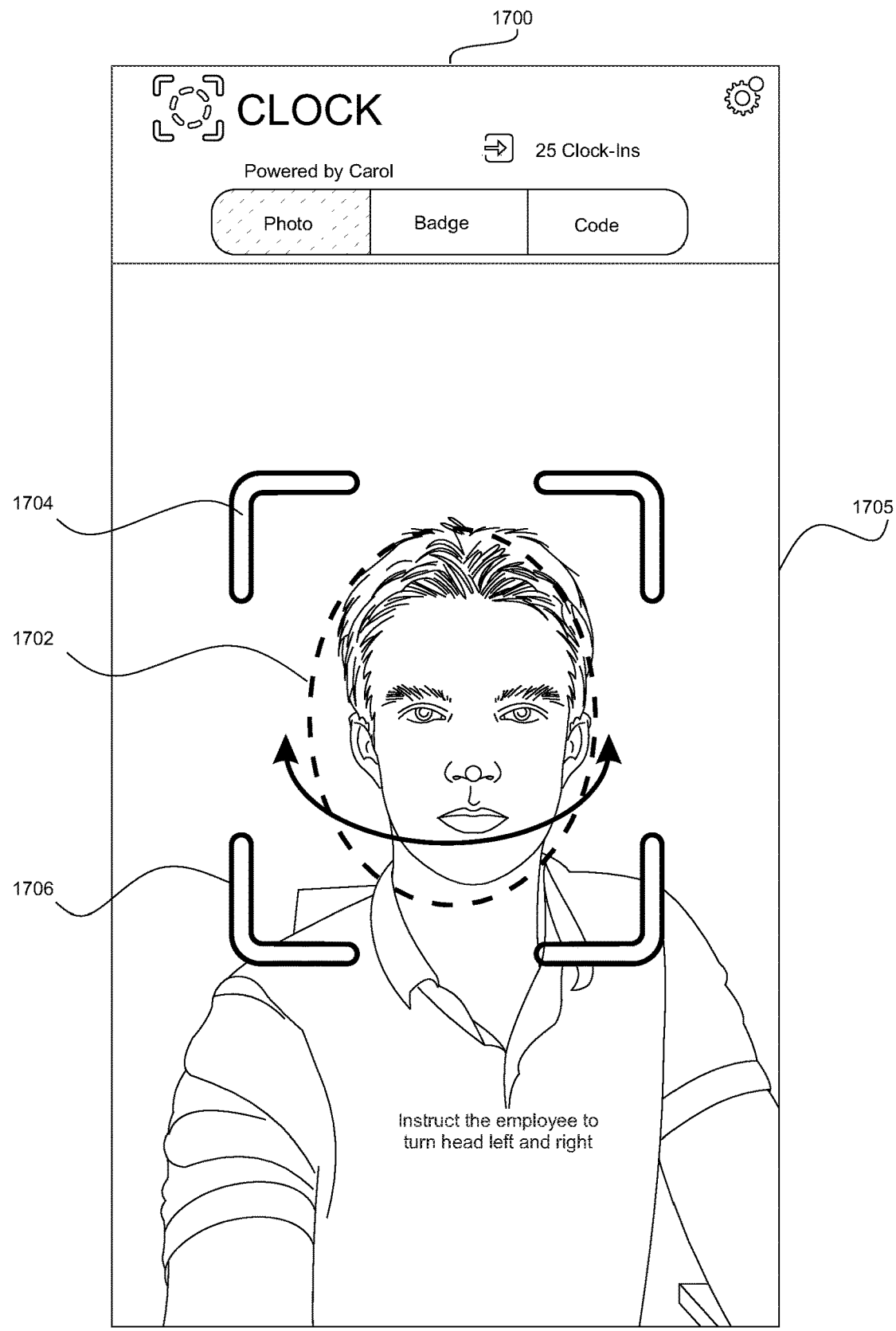
FIGS. 17A-17C illustrate images that may be displayed during liveness detection according to an embodiment of the present invention.

In step 735, face scan guide 210 checks whether to display face guides. If no, control proceeds to step 760. If yes, control proceeds to determine a face region encompassing the detected face area (step 740). In step 742, a head region encompassing the face region is determined. In step 750, graphical indications for the determined face and head regions and movement of a face are generated for display. For example, as shown in FIG. 17A, a display panel 1700 may include an oval dashed line 1702, a set of corners 1704, and a curved double arrow 1706 displayed on an image 1705 of a scene including a user's face in the camera field of view. Oval dashed line 1702 demarcates the determined face region. Set of corners 1704 demarcates the determined head region. Curved double arrow 1706 shows visually how a user should move their head from side to side during a scan. Instructions may also be displayed in text.

In step 760, a user is enabled to select to capture the image. For example, a button or other user interface element may be displayed to a user to command capture. This may be done manually or automatically. For example, a user may select a button to direct clock in assistant 203 to capture the image or it may happen automatically where clock in assistant 203 automatically captures the image when a face is detected within a proper location for capture. In step 770, the final image is captured and stored by face scan guide 201 in a user clock in data record in response to the user selection in step 760.

Liveness Detection

Figure 17B:
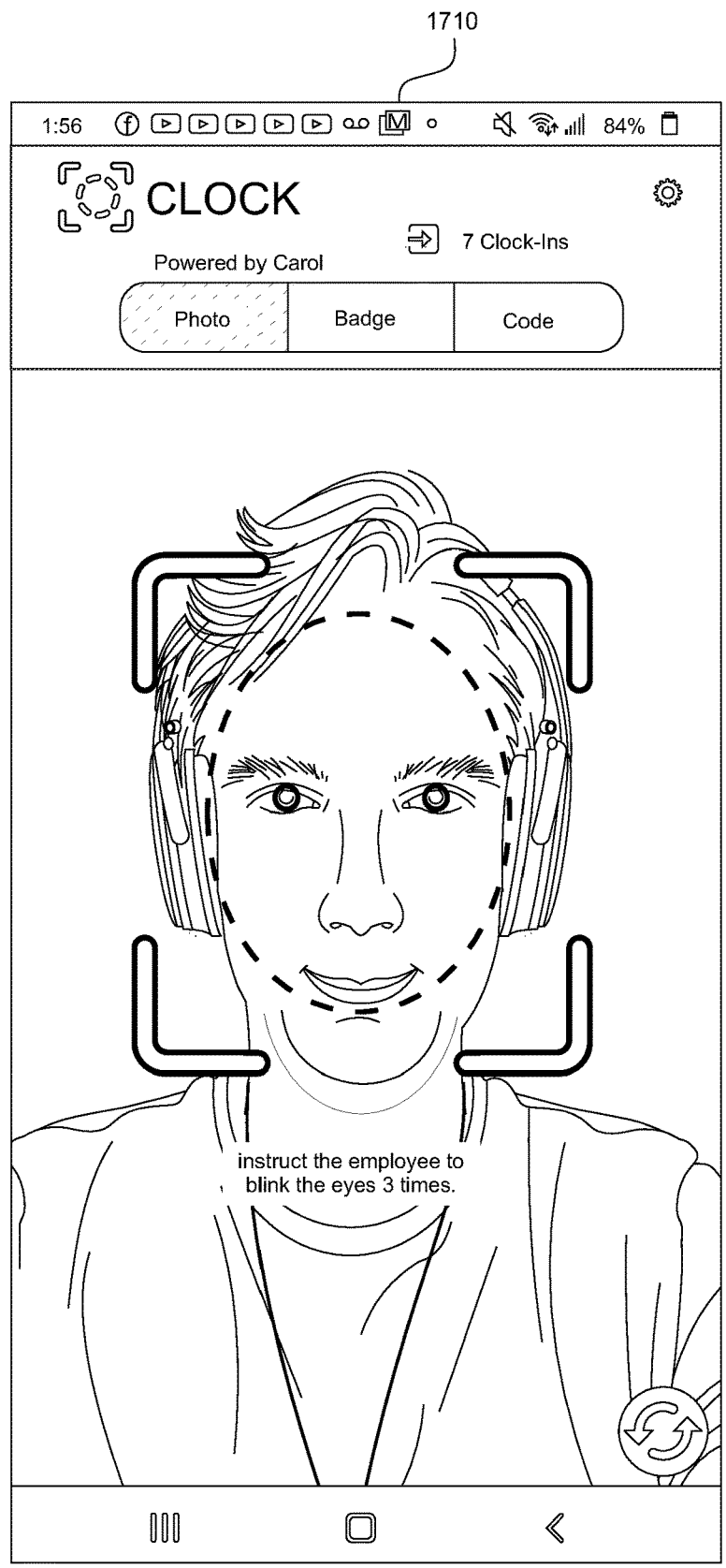
Figure 17C:
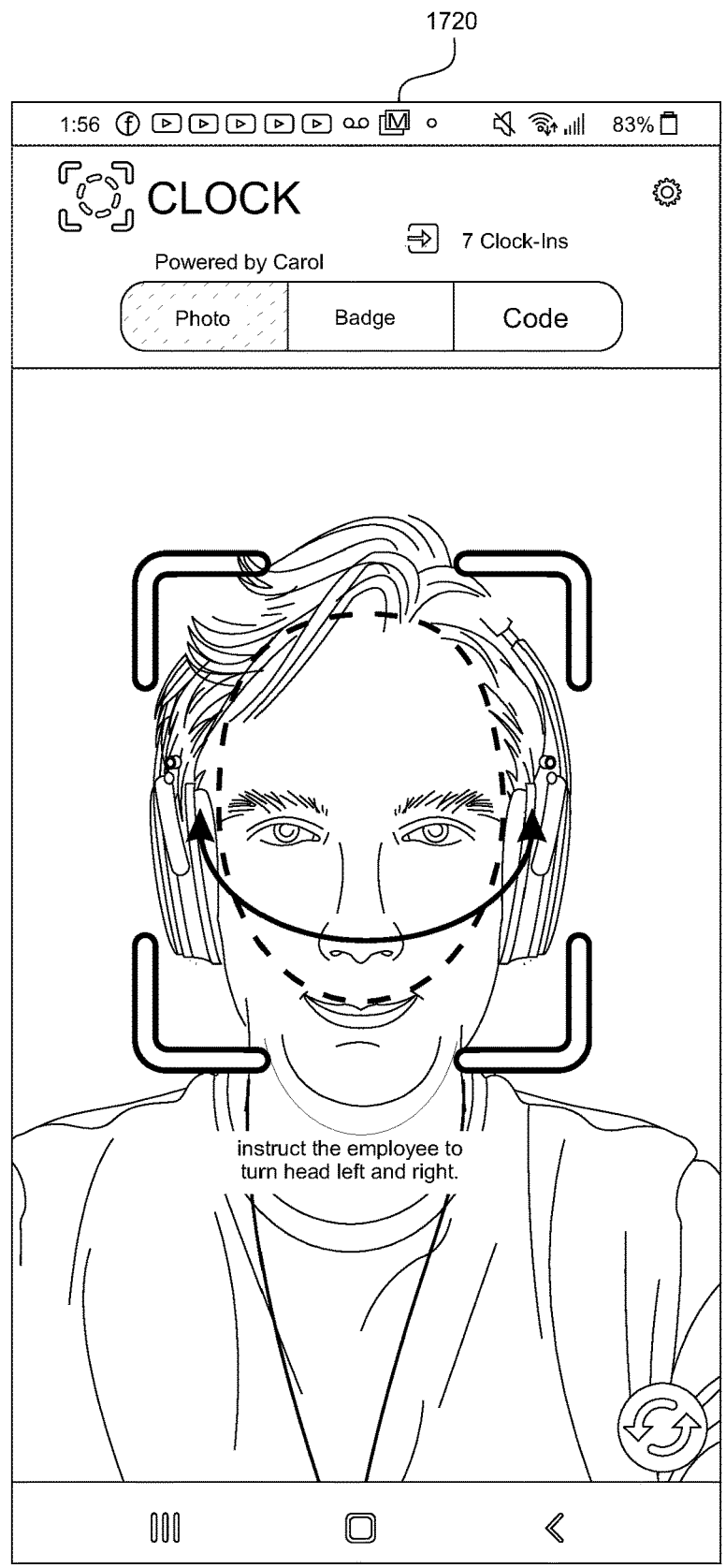

FIG. 8 is a flowchart of a process 440 for detecting liveness in a face scan according to an embodiment of the present invention (steps 810-844). In one embodiment, process 440 including steps 810-844 are carried out under the control of clock in assistant 203, and in particular, liveness detector 220. In step 810, one or more commands are output to a user to perform a liveness action, such as, blink eyes or move head. These commands may be output in visual, audio or tactile form on clock in device 201. For example, as shown in FIG. 17B, textual instructions to blink three times may be output on display 209 for a user to see in display panel 1710. Textual instructions to turn head left and right may be output on display 209 for a user to see in display panel 1720 (FIG. 17C).

In step 820, multiple images obtained during a scan period are captured. For example, digital camera 206 may take successive images of a field of view over a scan period and store digital images obtained during the scan period in memory 204.

In step 830, the images captured during the scan period and stored, are analyzed. In one embodiment, liveness detector 220 analyzes the images based on data obtained from a trained neural network. In particular, a sequence of images are analyzed to determined whether one or more liveness actions occurred. For example, the images may be analyzed to determine whether a number of blinks occurred that exceed a threshold and whether face movement occurred. The neural network is trained according to training data such as a set of representative images to determine criteria indicative of liveness actions, such as, pixel variations between images caused by eye blinks and facial movement.

In step 840, liveness detector 220 determines whether liveness is detected. If one or more liveness actions determined in step 830 occurred than liveness is detected. In one example, if a number of blinks greater than a threshold (say 2 blinks) were determined, then liveness is detected. If face movement, such as when a head is moved left to right, is determined in step 830, then liveness is detected. In another example, multiple liveness actions may be required to be met, such as, a number of blinks and face movement. If liveness is not detected, control proceeds to step 842 and a no liveness condition may be reported by liveness detector 220. If liveness is detected, control proceeds to step 844, an indication of liveness detection is stored or reported. For example, liveness detector 220 may set one or more flags or data fields to record liveness detection and the type of liveness action detected. These flags or data fields for liveness may be also included in user clock in event data and stored in a user clock in data record.

Fraud Detection

FIG. 9 is a flowchart of a process 450 for detecting fraud in a clock in according to an embodiment of the present invention (steps 910-944). In one embodiment, process 450 including steps 910-944 are carried out under the control of clock in manager 140, and in particular, fraud detector 310. In step 910, timestamp data and synchronization data area associated with a clock in event are analyzed to determine whether a fraud condition has occurred. A score may be calculated representing the likelihood fraud has occurred. The fraud score may then be compared to a threshold to determine whether a fraud condition is met.

In step 920, a GPS signal recorded at the time of a clock in event is analyzed to determine whether the GPS signal is a fake signal.

In step 930, a geofencing check is carried out. A location of a captured image at the time of a clock in event is compared to an authorized geofence area. The location may a GPS location or other location data (e.g., Wifi or cellular tower data) captured at the mobile device 102 (and made available with consent) at the time of clock in for a user.

In step 940, a determination is made on whether fraud is detected. Fraud may be detected based on one or more of the results of steps 910-930 depending upon a particular application and likelihood or sensitivity to fraud. For example, fraud may be detected based on occurrence of a high fraud score in step 910, presence of a fake GPS signal in step 920, failure to remain in a geofence area in step 930, or any combination thereof of these events.

If fraud is detected, control proceeds to step 942 and a fraud condition is stored and reported. If fraud is not detected, control proceeds to step 944, an indication of fraud detection is stored and reported. For example, one or more flags or a data field may be set to record fraud detection and the type of fraud condition detected. These flags or data fields for fraud may be also included in user clock in event data and stored in a user clock in data record.

Depending upon a level of security, fraud detection may or may not be reported to a user performing a self or group clock in. Also fraud detection may occur after clock in and may be reported to supervisors. For example, fraud detection may be carried out later upon synchronization of a clock in device 201 with platform 120 or when a clock in device 201 is online and coupled to platform 120.

Facial Encoding Comparison and Intelligent Thresholds

Figure 10:
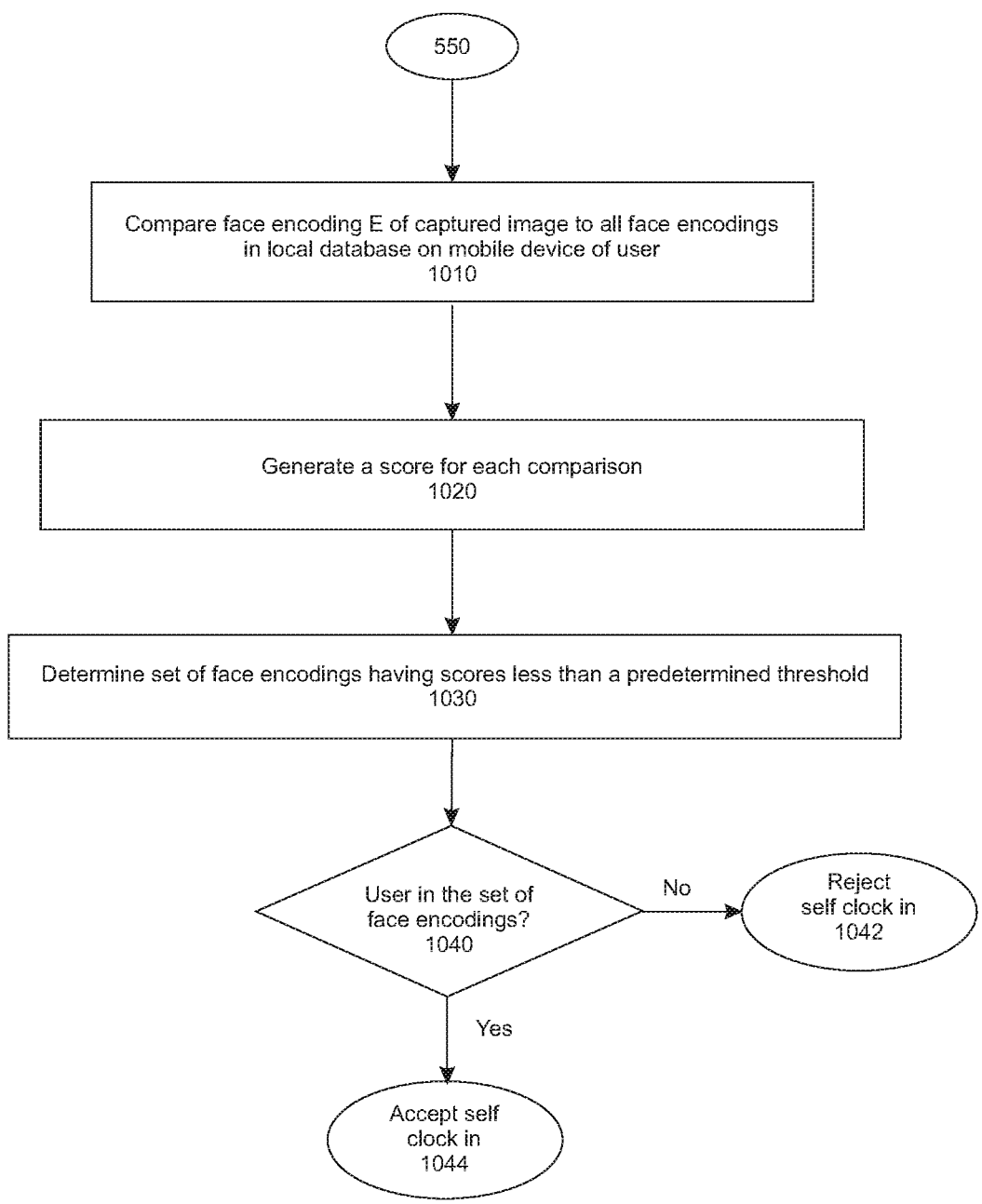
FIG. 10 is a flowchart of a process for comparing encoding to verify a match in a clock in according to an embodiment of the present invention.

FIG. 10 is a flowchart of a process 550 for comparing encoding to determine a match in a clock in according to an embodiment of the present invention (steps 1010-1044). In one embodiment, process 550 including steps 1010-1044 are carried out under the control of clock in assistant 203, and in particular, by facial image comparator 230.

In step 1010, facial image comparator 230 compares a face encoding E of a captured image to previous face encodings stored on a local database on a mobile device of a user. As mentioned earlier in one example encoding E may be an array data structure made up 128 floating point numbers.

In step 1020, a score is generated for each comparison. A set of face encodings having scores less than a predetermined threshold (T) is determined (step 1030). Scores below the threshold T indicate a similarity between the compared encodings. In embodiments, an intelligent threshold calculator 320 at clock in manager 140 may be used to set the predetermined threshold (T). The T value may be sent by clock in manager 140 to clock in assistant 203 at initialization or start up.

In step 1040, facial image comparator 230 checks to determine if a user is in the set of face encodings (step 1040). If the set determined in step 1030 has a number of elements greater than an acceptable value (e.g, one or more), then yes, there is a match for the user identification at clock in and the self clock in is accepted (step 1044). If the number of elements are in the set are less than the acceptable value (e.g., zero), then self clock in is rejected (step 1042).

In one feature, threshold T may be determined according to training data. In this way, the threshold T may be set or adjusted according to a curve to calibrate performance and balance acceptable true and false positive rates of face matching in a given security context. An example process for determining T is described further with respect to FIGS. 11 and 12.

Automatic Threshold Tuning for Facial Verification

Figure 11:
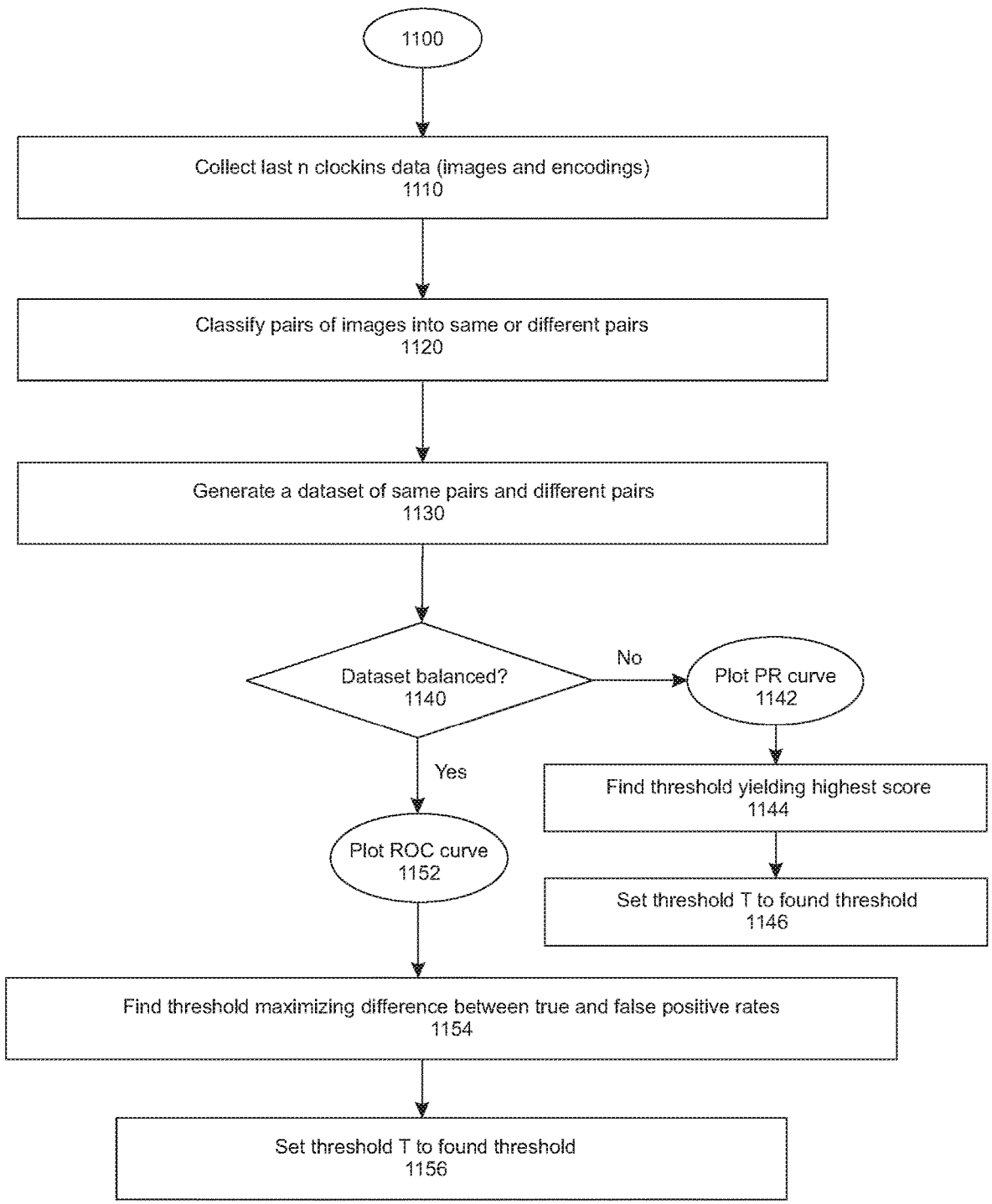
FIG. 11 is a flowchart of a first algorithm for determining a threshold for verifying a match in a clock in according to an embodiment of the present invention.

FIG. 11 is a flowchart of an algorithm 1100 for determining a threshold for verifying a match in a clock in according to an embodiment of the present invention (steps 1110-1156). In one embodiment, process 1100 including steps 1110-1156 are carried out under the control of clock in manger 140, and in particular, intelligent threshold calculator 320.

In step 1110, data is collected on the most recent number n of clock ins. The number n is a whole number; for example, it maybe 1000 for the last 1000 clock ins (also called clock in events). The data collected may be the facial images and associated facial encodings for each of then clock ins. In step 1120, pairs of the collected facial images are classified. In particular, the pairs of images are classified into the same or different pairs according to whether the facial images in the pairs are the same or different than one another. Here "same" refers to same (as in identical) or substantially the same (nearly identical or substantially close). A dataset of the pairs classified as same pairs and different pairs is generated (step 1130).

A check is made to determine whether the dataset is balanced (step 1140). If yes, a Receiver Operating Characteristic (ROC) curve is plotted based on the dataset (step 1152), and control proceeds to step 1154. If no, a Precision Recall (PR) curve is plotted (step 1142). Then, control proceeds to find a threshold yielding a highest score (step 1144). For example, a threshold maximizing an 1 score may be selected as described with respect to FIG. 12.

In step 1146, threshold T is then set to the threshold found in step 1144.

Figure 12:
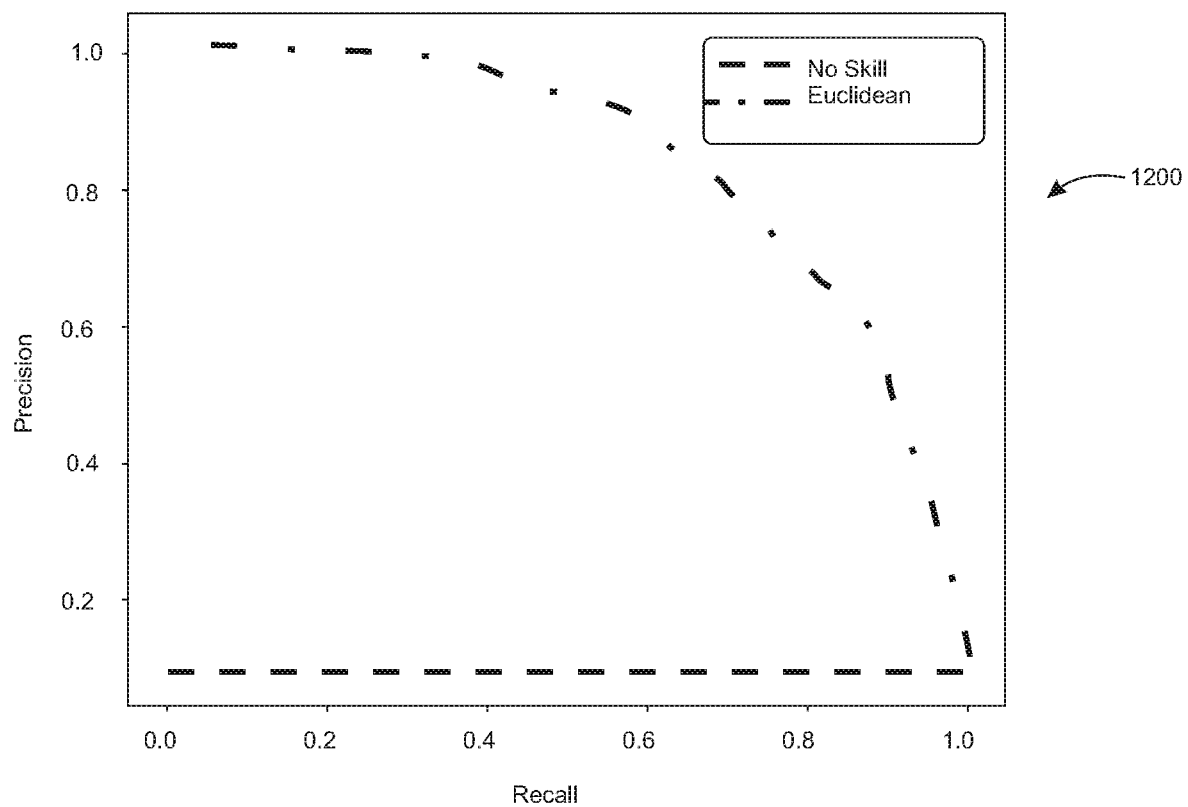
FIG. 12 is a curve illustrating operation of the first algorithm of FIG. 11 according to an embodiment of the present invention.

In FIG. 12, diagram 1200 shows an example curve that may be plotted for a dataset in step 1152. The plot shows precision (P) versus recall (R) rates between 0.0 and 1.0. To determine a threshold, one can pick a point in the precision-recall (PR) curve where the F1-score is the maximum. F1-score is the harmonic mean between precision value P and recall value R. It is computed as 2PR/(P+R).

In step 1154, a threshold is found that maximizes a difference between true and false positive rates occurring matches determined based on in the dataset. In step 1156, threshold T is then set to the threshold found in step 1154.

In a further feature, threshold T may be determined according to training data. In this way, the threshold T may be set or tuned according to the number of false rejections to calibrate performance and balance acceptable true and false positive rates of face matching in a given security context. An example process for determining T for verification is described further with respect to FIG. 13.

Figure 13A:
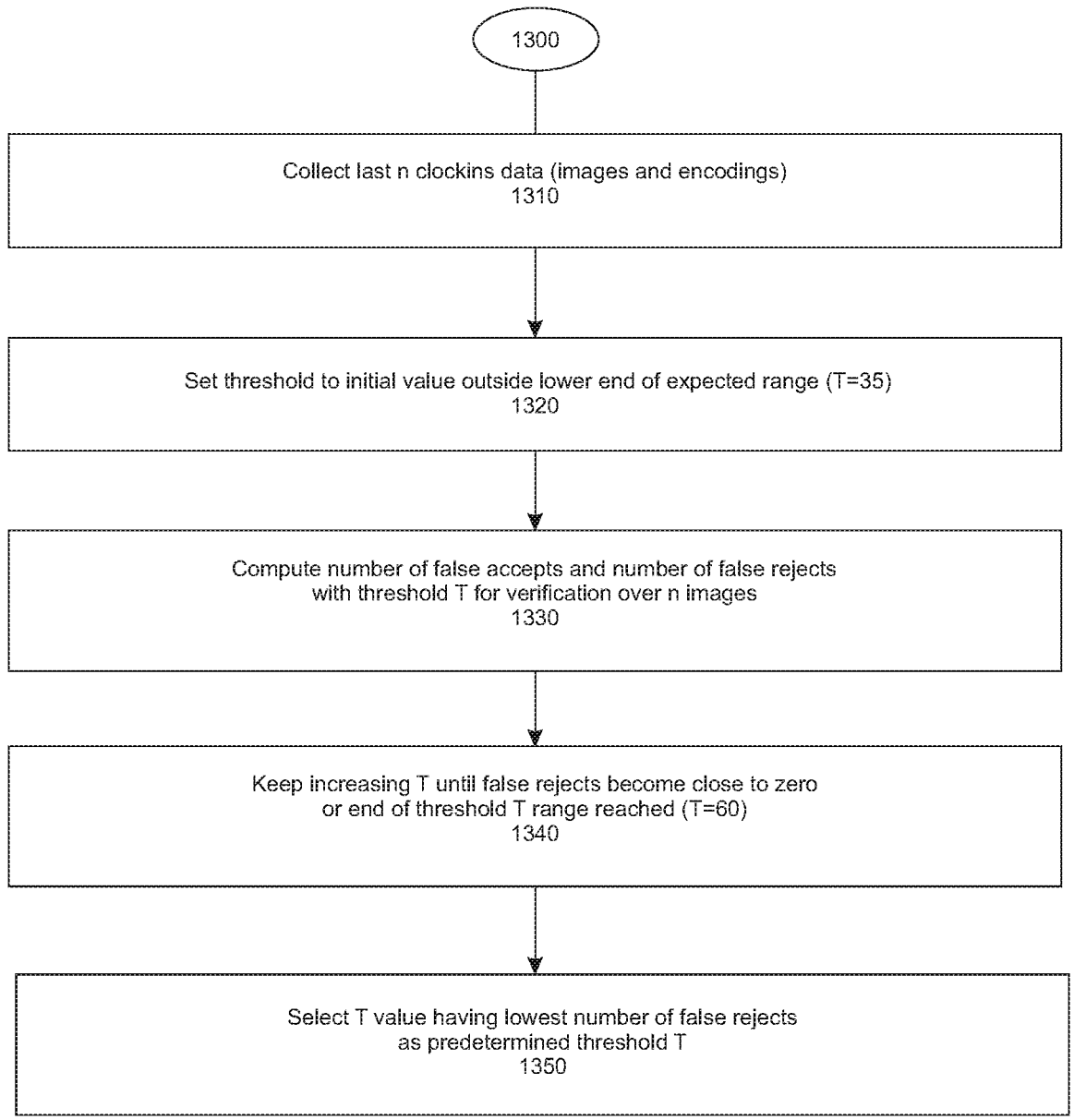
FIG. 13A is a flowchart of a second algorithm for determining a threshold for verifying a match in a clock in according to an embodiment of the present invention.
Figure 13B:
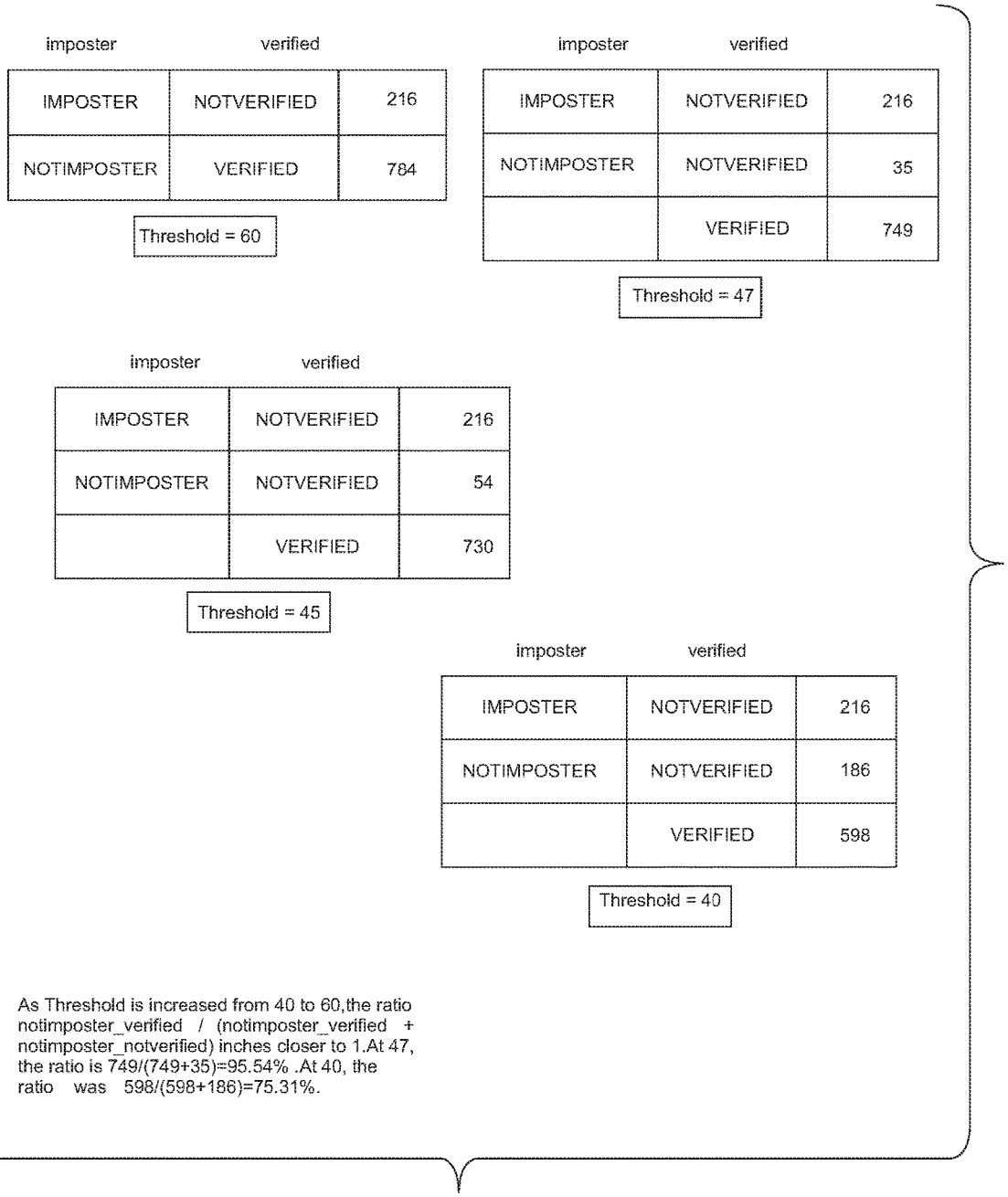
FIG. 13B shows a set of tables with conditions illustrating operation of the second verification algorithm of FIG. 13A according to an embodiment of the present invention.

FIG. 13A is a flowchart of a second algorithm 1300 for determining a threshold for verifying a match in a clock in according to an embodiment of the present invention (steps 1310-1350). In one embodiment, process 1300 including steps 1310-1350 are carried out under the control of clock in manger 140, and in particular, intelligent threshold calculator 320. FIG. 13B shows a set of tables with conditions illustrating operation of the second algorithm of FIG. 13A according to an embodiment of the present invention.

In step 1310, data is collected on the most recent number n of clock ins. The number n is a whole number; for example, it may be 1000 for the last 1000 clock ins (also called clock in events). The data collected may be the facial images and associated facial encodings for each of the n clock ins.

In step 1312, a threshold T is set to an initial value outside a lower end of an expected range. For example in a range of 0 to 100 where an expected range is 40-60 (and considered good based on empirical evidence), T may be set to an initial value of 35.

In step 1330, for over n images, compute a number of false accepts (FA) and a number of false rejects (FR) for the initial threshold T.

In step 1340, increase T and compute FA and FR as described in step 1330, until the computed number of false rejects FR equals or approaches zero, or and end of a threshold range is reached. For example, T may be increased from the initial value 35 toward an end of threshold range value 60, until FR equals or approaches zero, or the threshold range (T=60) is reached.

In step 1350, the predetermined threshold T value is selected to be the value T obtained for the lowest number of false rejects (FR) in step 1340.

For example, as shown in FIG. 13B, in step 1340, a threshold T may be increased from 50 to 60. A ratio of a number of Not Imposter Verified/(Not Imposter Verified+ Not Imposter Not Verified) is computed and moves closer to 1.0 as T increases. At the value t=47. The ratio is 749/(749+ 350) which is about 95.54%. Compared to T=40, where the ratio is 598/(598+186) which is about 75.31%. See legend in FIG. 13B.

A similar process for encoding comparison using a predetermined threshold T and algorithms for predetermining T may be used in process 650. Process 650 for encoding comparison to determine a match in a group clock in mode may be carried out similar to the described above for process 550 for a self clock in mode.

Figure 19:
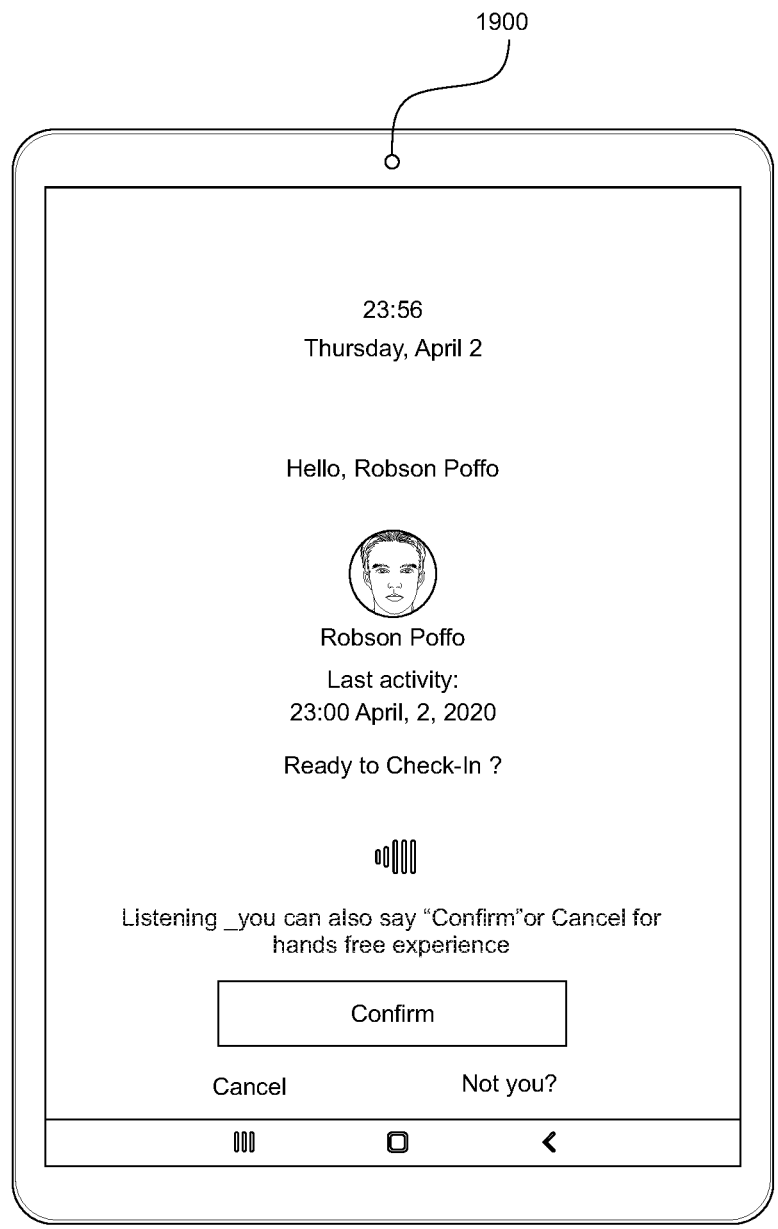
FIG. 19 illustrates a screenshot image of a display panel that may be displayed during a hands free clock in according to an embodiment of the present invention.

The self clock in and group clock in modes described above refer mainly to visual inputs such as user inputs entered through user-interface such as a touch screen, keyboard, or mouse, while viewing a display panel. However, audio or tactile inputs may also be provided. FIG. 19 illustrates a screenshot image of a display panel 1900 that may be displayed during a hands free clock in mode according to an embodiment of the present invention. An output is text or audio may query to a user, 'Ready to Check in?'. If yes, a user may respond with a voice input to initiate clock in. A voice assistant on mobile device 102 (such as, Siri® assistant from Apple Inc.) may also be used to further capture audio input and commands from a user. An application on mobile device 102 may show an icon indicating it is listening/waiting for a voice command. In this way, a user may use his or her voice to provide inputs and selections to control a self clock in or group clock in mode through clock in assistant 203 on clock in device 201.

Automatic Threshold Tuning for Facial Recognition

In a further feature, a threshold T used in facial recognition in step 650 described above may also be automatically tuned.

Figure 14A:
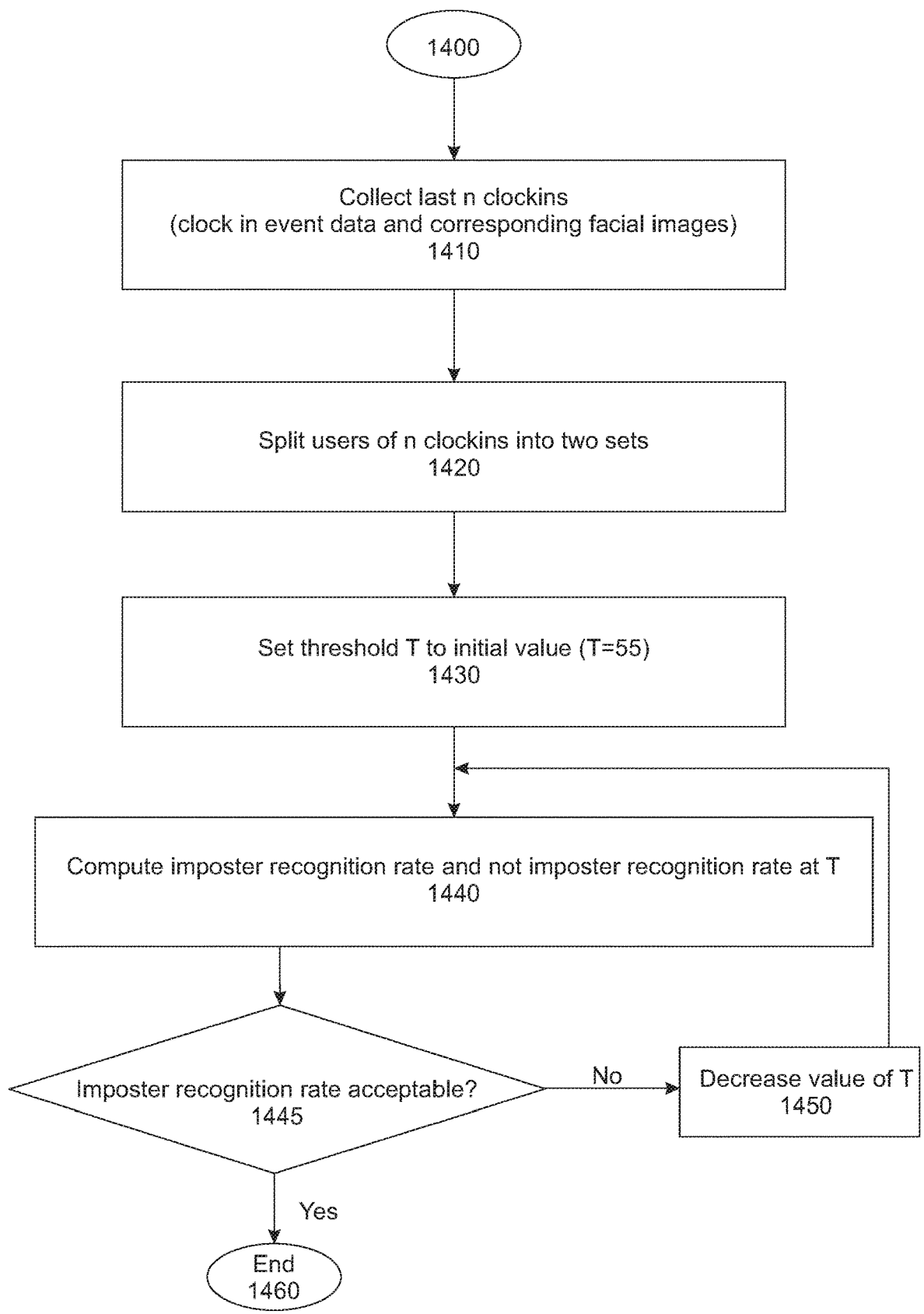
FIG. 14A is a flowchart of an algorithm for determining a threshold for recognizing one or more matches in a clock in according to an embodiment of the present invention.

FIG. 14A is a flowchart of an algorithm 1400 for determining a threshold for recognizing one or more matches in a clock in (steps 1410-1460). Algorithm 1400 may run after a few days of first onboarding and then, optionally, periodically (say every month). Empirically it is known that higher thresholds (T) are not good for recognition. In one embodiment, intelligent threshold calculator 320 may carry out algorithm 1400.

In step 1410, collect last n clockins (and the corresponding images). The last n clock ins may be for example clock in event data such as user names or user IDs and corresponding facial images for a set of n clock ins stored in training database 325.

Then split users of n clockins (say, of total r unique users) into two sets (step 1420). First set is p users with encodings present in a training database 325. These p users represent "legitimate" users (not imposters). Second set is q users without any encodings in the training database 325. (For a test case, one may manually remove the encodings of these q users from the database 325.) These q users represent "fraud" users (imposters). Notice that p+q=r. In this example, n, p, q, r are all positive integers.

In step 1430, set threshold T to an initial value (T=55). Then compute an imposter recognition rate and a not imposter recognition rate (step 1440). Imposter recognition rate is the rate or likelihood of a fraud user being recognized with threshold T. Not imposter recognition rate he rate or likelihood of a legitimate user being recognized. correctly with threshold T.

Notice that at very low T, False Rejects are very high. At very high T, False Accepts are very high. At the initial value T=55, one can expect False Accepts to be high and False Rejects to be low.

In step 1445, an evaluation is made on whether the imposter recognition rate is acceptable. If no, in step 1450, decrease T and return control to step 1440. If yes, imposter recognition rate is acceptable, then control proceeds to end (step 1460). Note when decreasing T, False Rejects keeps increasing while False Accepts keeps decreasing.

FIG. 14B illustrates five different states 1-5 that may be obtained in recognition results and associated imposter/not imposter recognition rates and accuracy rate calculations according to an embodiment of the present invention. In this table, Imposter=Fraud. There are only two desirable/Good results. Imposter/Fraud not recognized (Row 1) and notimposter (legitimate) user being correctly recognized (Row 4). All others (Rows 2-3 and 5) are "Not Desirable". Rates are calculated as follows: fraud/imposter recognition rate=row2/ (row1+row2). Notimposter recognition rate=row 4/(row 3+row 4+row 5). Accuracy=(row1+row2)/(row1+row2+ row3+row4+row5).

Figure 14C:
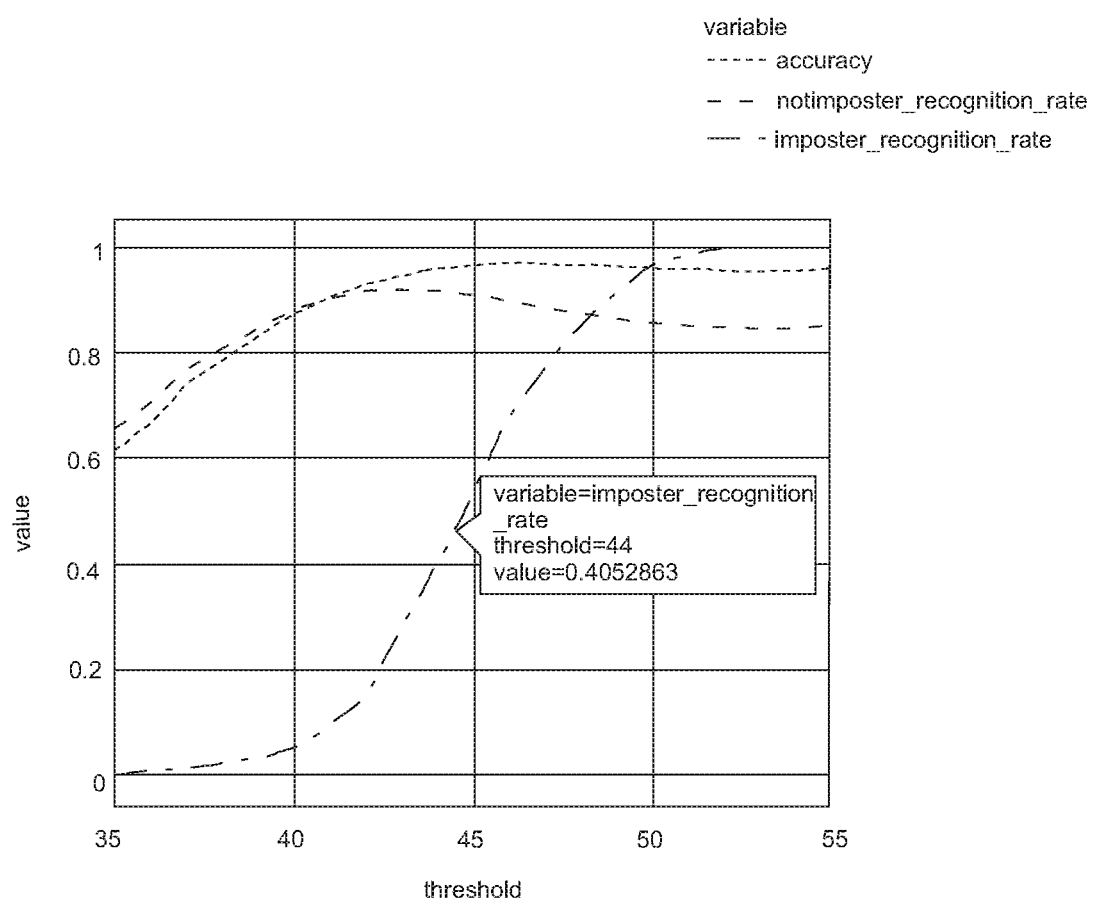
FIG. 14C shows a graph of associated imposter/not imposter recognition rates and accuracy rate illustrating recognition threshold tuning according to an embodiment of the present invention.

In FIG. 14C, a graph plots imposter/not imposter recognition rates and accuracy. The y axis has values between 0.0 to 1.0 for different threshold values T (x axis, 35-55). As shown in the graph in FIG. 14C, at T=55, the imposter recognition rate is 1. From observing the graph, one can see at around 46, notimposter recognition rate reaches maxima, but imposter recognition rate is at around 65%. At 40, imposter recognition rate is around 5% and notimposter recognition rate is around 88%. It appears 40 is the best (and acceptable) threshold. If one does not expect too many imposters, then perhaps 46 where notimposter recognition rate peaks is the best (and acceptable) threshold.

Finding Faces in a Scan

In one embodiment, before generating the embedding, clock in assistant 203 tries to detect a face in the image using a Face Detection (FD) algorithm. For performance and speed reasons, in one example, the FD algorithm may be a HoG-based (Histogram of Gradients) algorithm.

In some cases, the face in an image may not be aligned vertically. In this case, the FD algorithm fails to find a face. If a face is not found in an image, then clock in assistant 203 keeps rotating the image by x degrees until a face is found by the FD algorithm, where x is a number. If the face is still not found, clock in assistant 203 may use a CNN-based face detector (for example, MTCNN) instead of a HoG-based detector as a further option. A HoG-based face detector is much faster than a CNN-based face detector, but a CNN-based face detector is more accurate. In this way, clock in assistant 203 may use either a HoG or CNN based detector depending upon a desired performance-accuracy tradeoff.

Supporting Face Detection with Masks

In a further feature, the inventors recognize in the times of pandemic such as the presence of coronavirus (COVID- 19), it may be important to verify or recognize users when they are wearing masks, such as facial masks covering at least a nose and mouth.

In one example, clock in assistant 203 before generating encoding for a face, runs a Face Detection (FD) algorithm to first detect a face in the image. A technique based on HoG (Histogram of Gradients) is used to detect faces.

With masks on, the FD algorithm fails often to detect a face. The inventors found certain changes to the parameters of HoG-based FD algorithm may detect faces with masks better. Alternatively, a CNN-based face detector may be able to detect faces if a mask is worn.

The inventors have found after the face is successfully detected, verification is relatively successfully but recognition is more difficult with masks on.

The inventors preliminary experiments show that the distance between image/encoding of a person wearing mask and image/encoding of that same person not wearing mask is around 55. This value 55 is higher than if masks were not worn.

At this higher threshold (T around 55), verification may still continue working (assuming an employer may not have too many illegal attempts of type "User X trying to impersonate Y"). But recognition will have high false accepts (either a legitimate person recognized as someone else OR a fraud getting illegal access)

In summary, with masks, clock in assistant 203 can make the Face Detection algorithm detect faces correctly, verification can be made to work for self clock in mode, but recognition is difficult for a group clock in mode.

Analytics and Reporting

In a further feature, platform 120 may output data analytics regarding clock ins by users. Platform 120 may include a report engine 330 coupled to access data in one or more databases (132, 142, 152, 162). Report engine 330 includes filters, a devices map, and a clock in map.

FIGS. 20A-A and 20A-B are a screenshot image of a display panel 2000 that may be output by clock in management system 100 (and in particular clock in manager 140) to facilitate analysis and reporting of clock in operations according to an embodiment of the present invention. A control panel 2001 includes buttons that enable an authorized user (such as an administrator or supervisor) to select to filter data and view analytics on clock in events according to companies, locations, devices, devices list, devices map, clock in map or employees. Panel 2000 also includes a display area 2002 having one more filters 2003. A user may select these filters 2003 to control filtering of data by categories, such as, device location, devices, supervisor user ID or email address, tax ID, HR integration, and status. Another display area on panel 2000 may output results of the applied filtered. For example, a result 2004 shows a graphical representation of clock in data for a user satisfying the applied filters. This includes text and chart information relating to the clock in data for result 2004 (such as employee email address, location, clock in data range, and a bar chart of number of clock ins each day over the data range). Buttons for export to file formats such as AFD files or MS Excel files are also provided.

FIGS. 20B-A and 20B-B are a screenshot image of a display panel 2010 that may be output by clock in management system 100 when a device map button is selected in control panel 2001. A display area 2014 includes a map showing locations of devices used in clock in events by users according to the applied filters 2003. Graphical indications such as color and size may be used at different locations on the map to represent different devices. In one example, a map may show data resulting from queries by clock in manager 104 to access a Google Map API to display the results of the applied filters in a map form and to allow navigation through the map to zoom in and zoom out on the data results.

FIGS. 20C-A and 20C-B are a screenshot image of a display panel 2020 that may be output by clock in management system 100 when a clock in map button is selected in control panel 2001. A display area 2024 includes a map showing locations of clock in events by users searched according to the applied filters 2022. Graphical indications such as color and size may be used at different locations on the map to represent different clock in events. In one example, a map may show data resulting from queries by clock in manager 104 to access a Google Map API to display the results of the applied filters in a map form and to allow navigation through the map to zoom in and zoom out on the data results.

FIG. 21 is a diagram of an example architecture supporting clock in platform 120 according to an embodiment. Platform 120 is implemented on one or more application servers 210. In one example, each of human resource system 130, clock in manager 140, online sync connector 150 and data storage manager 160 may be implemented on one or more application servers 210. Application servers 210 are coupled to one or more web servers 180, communication servers 220, and database servers 230. Web server(s) 180 for example may support World Wide Web protocols, such as, Hypertext Transfer Protocol (HTTP) and other protocols, used in communication and services provided over the web to fulfill client requests, such as, displaying content to and from websites and to and from web applications for display in browsers on remote devices. Web server may be configured to accept requests for resources from client devices, such as web pages and send responses back to client devices. Any type of web server may be used including, but not limited to, Apache available from the Apache Project, IIS available from Microsoft Corp., nginx available from NGINX Inc., GWS available from Google Inc., or other type of proprietary or open source web server. A web server may also interact with a remote server. Communication servers 220 send and receive communications for different users, such as, text (SMS) or email messages. In one embodiment, a user (owner of the clockin) receives a receipt. For example, a receipt may be an image following a standard in Brazil or other country for this kind of information. Depending upon a particular application or need, a user may configure to receive the receipt by email or SMS, and both messages may follow the same standard (such as an image and associated relevant information for the receipt such as day time and employee or user ID). Database server(s) 230 under the control of data storage manager 160 manage data storage and retrieval across databases 132, 142, 152 and 162.

Data Separators

In a further embodiment, a company or organization having groups of employees or contractors may be added to system 100 in an installation. In an example clock in installation, users are usually grouped by country. But grouping by any other criteria is also possible.

Each clock in installation is capable of recognizing different sets of employees. All of the properties of data models can be configured to be used as separators. That is, any column of the data model (which is a table) can be used to group clock ins or in self clock ins. For example, clock ins can be separated by country code. So, one user performing a self clock in would only be able to see employees from countries which he has permission to query. For example, consider a company having 100 users at three locations where people clock in. Now, system 100 may be configured to put 20 users in a first location, 30 in a second location, and 50 in the third location. System 100 (and in particular clock in assistant 203 or clock in manager 140) may ensure that a first user can only clock in in the first location, for example.

Further Embodiments

Further embodiments include:

31. A computer-implemented method for enabling users to clock in to a cloud computing platform over a network through remote devices, regardless of whether the remote devices are online or offline, comprising:

initializing user clock in data stored on a database and in memory in the remote devices;

enabling users to clock in at the remote devices with verified or recognized face detection in self clock in or group clock in modes when the remote devices are online or offline;

synchronizing user clock in data when the remote devices are online; and updating user clock in data captured in self clock in or group clock in modes when remote devices are online and communicatively coupled to a clock in manager on the cloud computing platform.

32. The method of claim 31, further comprising storing the updated user clock in data in records on a blockchain ledger.

33. The method of claim 31, wherein the clock in enabling further comprises:

enabling a user of a remote device to select a self clock in mode including facial detection;

capturing a digital image of a face of the user perform a self clock in;

determining clock in encoding data including facial image data representing the captured digital image of the user face and associated encoding of the facial image data; and comparing the determined encoding data and validated encoding data stored in the local storage in memory on the remote device to determine whether a match condition is met; and verifying the clock in by the user in the self clock in mode when the match condition is met.

34. The method of claim 33, further comprising enabling the user of the remote device to input a QR code or an identification ID code.

35. The method of claim 33, further comprising:

storing in memory on the remote device a set of validated encoding data for the authorized user corresponding to a predetermined number of most recent clock ins verified in the self clock in mode.

36. The method of claim 35, wherein the comparing includes:

generating a score for each comparison between the determined encoding data and the set of validated encoding data;

determining a set of face encodings having scores less than a predetermined threshold T; and accepting a user for self clock in based on the determined the set of face encodings having scores less than a predetermined threshold.

37. The method of claim 36, further comprising:

collecting a set of encoding data for a number n clock ins;

classifying pairs of images in the set of encoding data into same and different pairs;

generating a dataset of same pairs and different pairs;

checking whether the dataset is balanced;

when the dataset is not balanced, plotting a first curve, finding a first threshold yielding a highest score and setting threshold T to the found first threshold; or when the dataset is balanced, plotting a second curve, finding a second threshold maximizing a difference between true and false positive rates;

and setting threshold T to the found second threshold.

38. The method of claim 31, further comprising displaying one or more face guides to facilitate capture of a facial image or placement of a face in a scan during self clock in or group clock in at the remote device.

39. The method of claim 38, wherein the face guide displaying comprises:

determining a face region encompassing a detect face area;

determining a head region encompassing the face region; and displaying graphical indications for face and head regions and movement of the face.

40. The method of claim 31, further comprising detecting liveness in a face scan during self clock in or group clock in at a remote device.

41. The method of claim 40, wherein the liveness detecting comprises:

outputting one or more commands to a user at the remote device to blink eyes and move head in a scan period;

capturing images obtained during the scan period;

analyzing the captured images based on trained neural network data to determine whether a number of blinks occurred that exceed a threshold and whether face movement occurred.

42. The method of claim 31, further comprising detecting fraud during self clock in or group clock in at a remote device.

43. The method of claim 42, wherein the fraud detecting comprises at least one of the following steps:

analyzing timestamp data of captured image and sync data to determine whether day and time of capture image meets a fraud condition;

analyzing GPS information to determine if a GPS fake signal is present; or determining whether the captured image was obtained within an authorized geofence area.

44. The method of claim 31, wherein the clock in enabling further comprises:

enabling a team leader of a remote device to select a group clock in mode including facial detection of multiple users;

capturing digital images of faces of the multiple users to perform a group clock in of the users;

for each user, determining clock in encoding data including facial image data representing the captured digital image of the user face and associated encoding of the facial image data; and comparing the determined encoding data with validated encoding data stored in the local storage in memory on the remote device or on a database to determine a set of candidate users;

presenting a display of the set of candidate users to the team leader for recognition; and enabling the team leader to accept a recognized user from the set of candidate users for clock in.

45. The method of claim 31, further comprising:

determining a background border region outside of a detected face; and obscuring the background border region in a display image output to a user at the remote device, whereby a user may more easily view an area for placement of the face in a display image to be captured at the remote device.

46. The method of claim 45, wherein the obscuring comprises blurring or shading pixels in the background border region in the display image.

47. The method of claim 31, further comprising:
storing the updated user clock in data in a database;
applying one or more filters to the clock in data stored in the database; and
enabling a user to select one or more presentations of filtered data from a control panel including map displays of devices or clock in events according to geolocation.

48. A non-transitory computer-readable device having instructions stored thereon that, when executed by at least one computing device, causes the at least one computing device to perform operations comprising:
communicating over a network to a cloud computing platform when online; and
enabling a user to perform self clock in or group clock in with verified or recognized face detection when online or offline with respect to the cloud computing platform.

49. A non-transitory computer-readable device having instructions stored thereon that, when executed by at least one computing device, causes the at least one computing device to perform operations to enable users to clock in to a cloud computing platform over a network through remote devices, regardless of whether the remote devices are online or offline, comprising:
initializing user clock in data stored on a database of the platform and in memory in the remote devices;
enabling users to clock in at the remote devices with verified or recognized face detection in self clock in or group clock in modes when the remote devices are online or offline;
synchronizing user clock in data when the remote devices are online; and
updating user clock in data captured in self clock in or group clock in modes when remote devices are online and communicatively coupled to a clock in manager on the cloud computing platform.

50. A system enabling users to clock in to a cloud computing platform over a network through remote devices, regardless of whether the remote devices are online or offline, comprising:
means for managing clock in on a cloud computing platform through at least one of a self clock in mode or a group clock in mode at the remote devices; and
means for storing clock in encoding data, wherein the clock in encoding data includes facial image data representing a digital image of a user face and associated encoding of the facial image data.

Further Example Computer-Implemented Implementations

Synchronized clock in management as described herein can be implemented on or more computing devices. Computer-implemented functions and operations described above and with respect to embodiments shown in FIGS. 1-22 can be implemented in software, firmware, hardware or any combination thereof on one or more computing devices. Platform 120 including any of its components (human resource system 130, clock in manager 140, online sync connector 150 and data storage manager 160) may be implemented in software, firmware, hardware, or any combination thereof on one or more computing devices. Databases on platform 120 or clock in device 201 may store records and may be relational databases. This is illustrative and other data structures and types of computer-readable memory storage may be used for data storage.

In embodiments, synchronized clock in management and platform 120 including human resource system 130, clock in manager 140, online sync connector 150 and data storage manager 160 as described herein can be implemented on a server, cluster of servers, server farm, or other computer-implemented processing arrangement operating on or more computing devices. In one embodiment, platform 120 may be coupled to or integrated with a data platform such as the CAROL platform available from TOTVS Labs, Inc.

Platform 120 may also include application programming interfaces (APIs) for coupling to remote services. Platform 120 including clock in manager 140 may also be implemented as a software-as-a-service (SaaS), platform as a service (PaS), or other web enabled service for which a clock assistant 203 may access through a browser or as a native application supporting web protocols.

Embodiments are also directed to computer program products comprising software stored on any computer-usable medium. Such software, when executed in one or more data processing devices such as processor 202, causes a data processing device(s) to operate as described herein or, as noted above, allows for the synthesis and/or manufacture of electronic devices (e.g., ASICs, or processors) to perform embodiments described herein. Embodiments employ any computer-usable or -readable medium, and any computer-usable or -readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.). Computer-usable or computer-readable mediums can include any form of transitory (which include signals) or non-transitory media (which exclude signals). Non-transitory media comprise, by way of non-limiting example, the aforementioned physical storage devices (e.g., primary and secondary storage devices).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system enabling users to clock in to a cloud computing platform over a network through remote devices, regardless of whether the remote devices are online or offline, comprising:
   a clock in manager configured to communicate with a plurality of applications accessed by remote devices to manage clock in of users in at least one of a self clock in mode or a group clock in mode;
   a database, coupled to the platform, configured to store clock in encoding data, wherein the clock in encoding data includes facial image data representing a digital image of a user face and associated encoding of the facial image data,
   wherein the clock in manager is configured to send validated encoding data for an authorized user to a respective application for local storage in memory on a remote device, whereby the respective application may verify a clock in by a user in a self clock in mode based on a comparison of encoding data captured at the time of clock in with validated encoding data stored in the local storage in memory on the remote device even when offline, and the respective application may enable a team leader to select from a set of recognized clock ins by a group of users in a group clock in mode when offline or online depending upon whether validated encoding data is stored in the local storage in memory on the remote device or in the database; and
   an online sync connector configured to send a request to the database to obtain data including validated clock in encoding data for authorized users, and to send initial sync data for authorized users to the clock in manager including requested validated clock in encoding data for authorized users obtained from the database.

2. The system of claim 1, wherein the clock in manager is configured to automatically synchronize user clock in data captured in self clock in or group clock in modes when remote devices are online and communicatively coupled to the clock in manager, and to store the synchronized user clock in data in the database.

3. The system of claim 2, wherein the clock in manager is further configured to automatically update synchronized user clock in data stored in the database to include data captured most recently in self clock in or group clock in modes.

4. The system of claim 1,
   wherein the online sync connector is configured to initiate initial synchronization of data between the clock in manager and the database for an approved company having multiple users.

5. The system of claim 1, wherein the clock in manager is configured to track a set of validated clock in encoding data for the authorized user corresponding to a predetermined number of most recent clock ins in self clock in mode, and whereby the set of validated clock in encoding data is stored in the local storage in memory on the remote device and the respective application may verify another clock in by a user in a self clock in mode based on a comparison of encoding data captured at the time of clock in with the set of validated clock in encoding data stored in the local storage in memory on the remote device even when offline.

6. The system of claim 1, wherein the clock in manager is configured to track sets of validated clock in encoding data for authorized users corresponding to a predetermined number of most recent clock ins in group clock in mode, and whereby the sets of validated clock in encoding data for each user are stored in the database or the local and the respective application may enable a team leader to select from a set of recognized clock ins for a group of users in a group clock in mode when offline or online depending upon validated encoding data stored in the local storage in memory on the remote device.

7. The system of claim 1, further comprising a human resource system coupled to the database, wherein the human resource system is configured to upload verified clock in encoding data including facial image data representing a digital image of a user face and associated encoding of the facial image data for each employee of an approved company on the cloud computing platform to the database.

8. The system of claim 1, further comprising a plurality of remote devices each having a respective application coupled to the clock in manager and configured to operate in at least one of the self clock in mode or the group clock in mode.

9. The system of claim 8, wherein the respective applications are installed on the remote devices for the self clock in mode or the group clock in mode and operate online or offline under the control of an operating system.

10. The system of claim 8, wherein the respective applications include web applications accessed through respective browsers on the remote devices and operate online with one or more servers to perform the self clock in or group clock in modes.

11. The system of claim 8, wherein the respective applications each output face guides to facilitate capture of a facial image or placement of a face in a scan during self clock in or group clock in at a remote device.

12. The system of claim 8, wherein the respective applications each include a liveness detector for detecting liveness in a face scan during self clock in or group clock in at a remote device.

13. The system of claim 8, wherein the respective applications each include a fraud detector for detecting fraud in a face scan during self clock in or group clock in at a remote device.

14. The system of claim 1, wherein the clock in manager outputs data to respective applications for displaying face guides to facilitate capture of a facial image or placement of a face in a scan during self clock in or group clock in at a remote device.

15. The system of claim 1, wherein the clock in manager further includes a liveness detector for detecting liveness in a face scan during self clock in or group clock in at a remote device.

16. The system of claim 1, wherein the clock in manager further includes a fraud detector for detecting fraud in a face scan during self clock in or group clock in at a remote device.

17. The system of claim 1, wherein the clock in manager further stores clock in encoding data captured for users in self clock in or group clock in modes on a blockchain ledger.

18. The system of claim 1, further comprising a report engine coupled to the database, wherein the report engine is configured to apply one or more filters to clock in data stored in the database and enables a user to select one or more presentations of filtered data from a control panel including map displays of devices or clock in events according to geolocation.

19. A device for performing remote clock in over a network to a cloud computing platform, comprising:
- a computer-readable memory;
- a communication unit for communicating over the network to the cloud computing platform; and
- a processor, coupled to the memory, and configured to execute an application that enables a user to perform self clock in or group clock in with verified or recognized face detection when online or offline with respect to the cloud computing platform,
- wherein the cloud computing platform includes an intelligent threshold calculator that determines a threshold value that maximizes a difference between true and false positive rates in facial verification based on previous clock in operations stored as training data, and
- wherein the threshold value is utilized by the application to determine similarity between a captured digital image of a face of a user at clock in and validated face encoding data.

20. The device of claim 19, wherein the cloud computing platform includes a clock in manager for synchronizing data between the application in a self clock in or group clock in mode when the device is online with respect to the cloud computing platform.

21. The device of claim 19, wherein the application comprises a web application operated through a browser or an application installed locally in the memory on the device.

22. The device of claim 19, wherein the application in a self clock in mode outputs one or more display panels that enable the user to capture the captured digital image for self clock in.

23. The device of claim 19, wherein the application in a group clock in mode outputs one or more display panels that enable a team leader to capture images of users for group clock in.

24. The device of claim 19, wherein the application further outputs face guides for display to facilitate capture of the captured digital image or placement of a face in a scan during a self clock in or group clock in at the device.

25. The device of claim 19, wherein the application further determines a background border region outside of a detected face and blurs or shades the background border region in a display image output to the user, whereby the user may more easily view an area for placement of the face in the display image to be captured.

26. The device of claim 19, wherein the application in a self clock in mode captures the captured digital image of the face of the user at the clock in, calculates clock in encoding data including facial image data representing the captured digital image of the face and associated encoding of the facial image data, and verifies the clock in by the user locally at the device based on a comparison of encoding data captured at the time of the clock in with the validated face encoding data stored in the local storage in memory on the remote device even when offline.

27. The device of claim 19, wherein the application in a group clock in mode enables a team leader to select from a set of recognized clock ins by a group of users in a group clock in mode when offline or online depending upon whether the validated face encoding data is stored in the local storage in the memory on the device or in a database in the cloud computing platform.

28. The device of claim 19, wherein the application further detects liveness in a face scan during self clock in or group clock in at the device.

29. The device of claim 19, wherein the application further detects fraud in a face scan during self clock in or group clock in at the device.

\* \* \* \* \*